US008448977B2

United States Patent
Grintz et al.

(10) Patent No.: US 8,448,977 B2
(45) Date of Patent: May 28, 2013

(54) STORAGE LATCH AND REVERSIBLE HANDLE FOR A STROLLER

(75) Inventors: Joseph Todd Grintz, Glenmoore, PA (US); Michael A. Dotsey, Pottstown, PA (US)

(73) Assignee: Graco Children's Products Inc., Atlanta, GA (US)

( * ) Notice: Subject to any disclaimer, the term of this patent is extended or adjusted under 35 U.S.C. 154(b) by 225 days.

(21) Appl. No.: 13/056,756

(22) PCT Filed: Aug. 3, 2009

(86) PCT No.: PCT/US2009/052614
§ 371 (c)(1),
(2), (4) Date: Apr. 25, 2011

(87) PCT Pub. No.: WO2010/015003
PCT Pub. Date: Feb. 4, 2010

(65) Prior Publication Data
US 2012/0025492 A1    Feb. 2, 2012

Related U.S. Application Data

(60) Provisional application No. 61/085,760, filed on Aug. 1, 2008, provisional application No. 61/085,796, filed on Aug. 1, 2008.

(51) Int. Cl.
*B62B 7/06*    (2006.01)
(52) U.S. Cl.
USPC .......................... 280/642; 280/650; 280/47.38
(58) Field of Classification Search
USPC ................. 280/638, 639, 642, 643, 647, 648, 280/649, 650, 657, 658, 47.34, 47.38, 47.371
See application file for complete search history.

(56) References Cited

U.S. PATENT DOCUMENTS

| 5,257,799 A | * | 11/1993 | Cone et al. | 280/642 |
|---|---|---|---|---|
| 5,845,924 A | * | 12/1998 | Huang | 280/642 |
| 7,210,699 B2 | * | 5/2007 | Lan | 280/642 |
| 7,281,732 B2 | * | 10/2007 | Fox et al. | 280/642 |
| 2004/0090045 A1 | * | 5/2004 | Kassai et al. | 280/642 |
| 2006/0273553 A1 | | 12/2006 | Lan | |

FOREIGN PATENT DOCUMENTS

GB    2 442 127    3/2008

OTHER PUBLICATIONS

International Search Report and Written Opinion issued in related PCT Application No. PCT/US2009/052614.

* cited by examiner

*Primary Examiner* — John Walters
(74) *Attorney, Agent, or Firm* — Lempia Summerfield Katz LLC

(57) ABSTRACT

A storage latch mechanism (160) is disclosed for a foldable stroller. The stroller has a frame assembly with a chassis (52) and a handle (54). The frame assembly is reconfigurable between an in-use configuration and a folded configuration and the handle (54) is movable between a normal use position and a stowed position relative to the chassis. The storage latch mechanism (160) has first and second storage latch parts carried on the frame assembly and which are latched to one another with the frame assembly in the folded configuration and which are unlatched from one another in the in-use configuration. Movement of the handle (54) to the stowed position frees the storage latch mechanism (160) to latch and movement of the handle from the stowed position to the normal use position unlatches the storage latch mechanism.

19 Claims, 26 Drawing Sheets

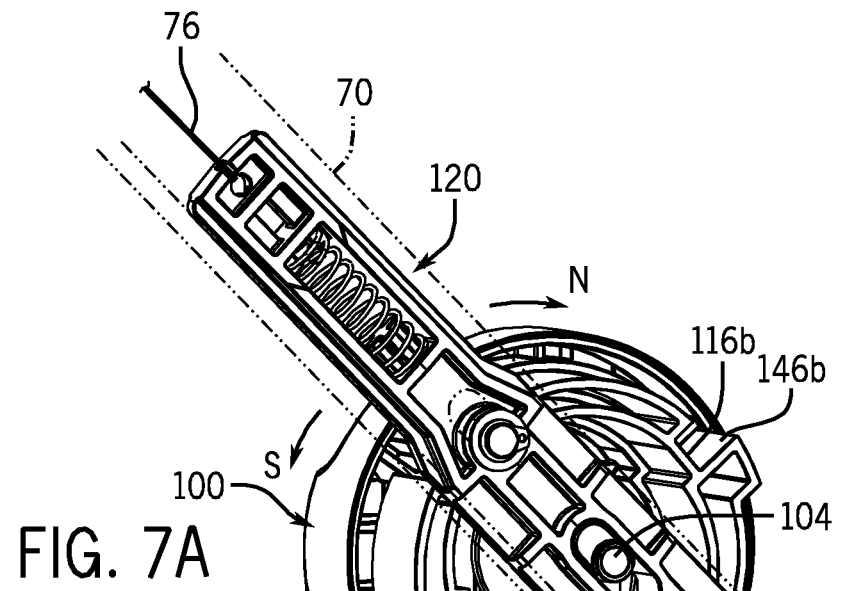
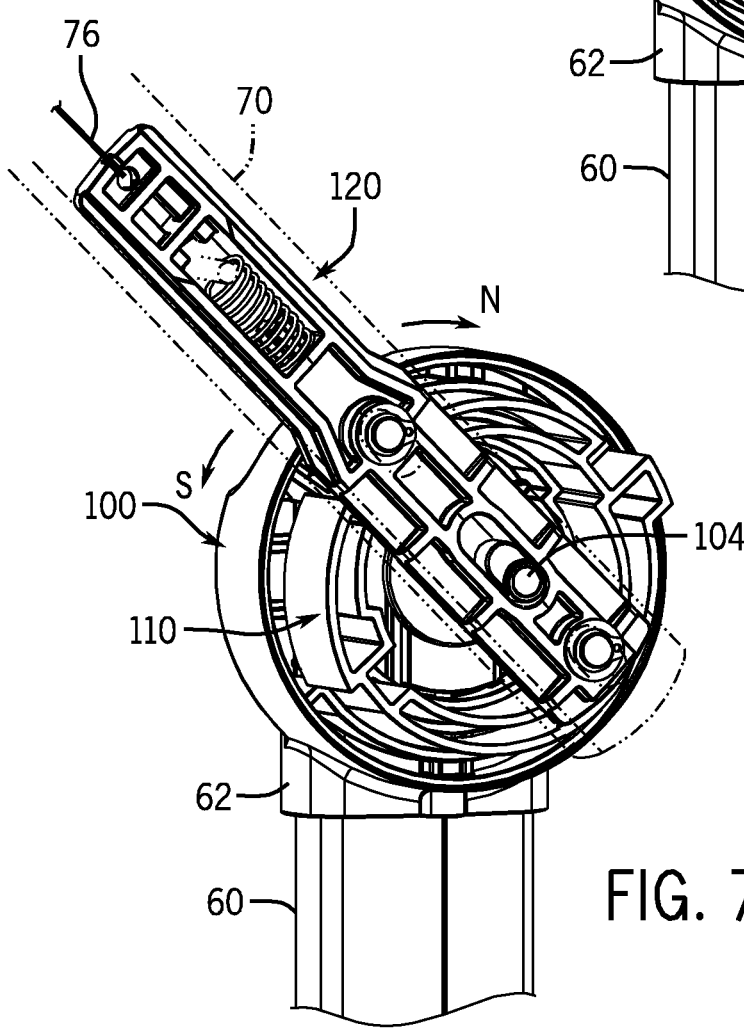
FIG. 7A
FIG. 7B

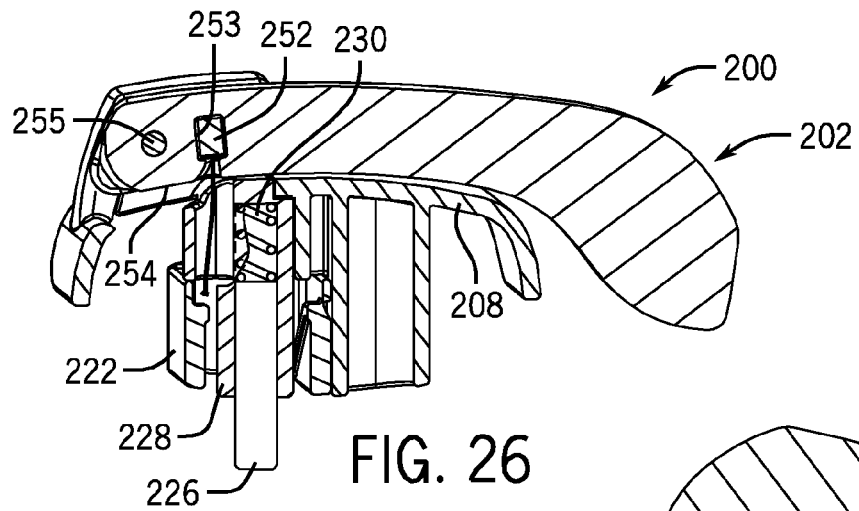
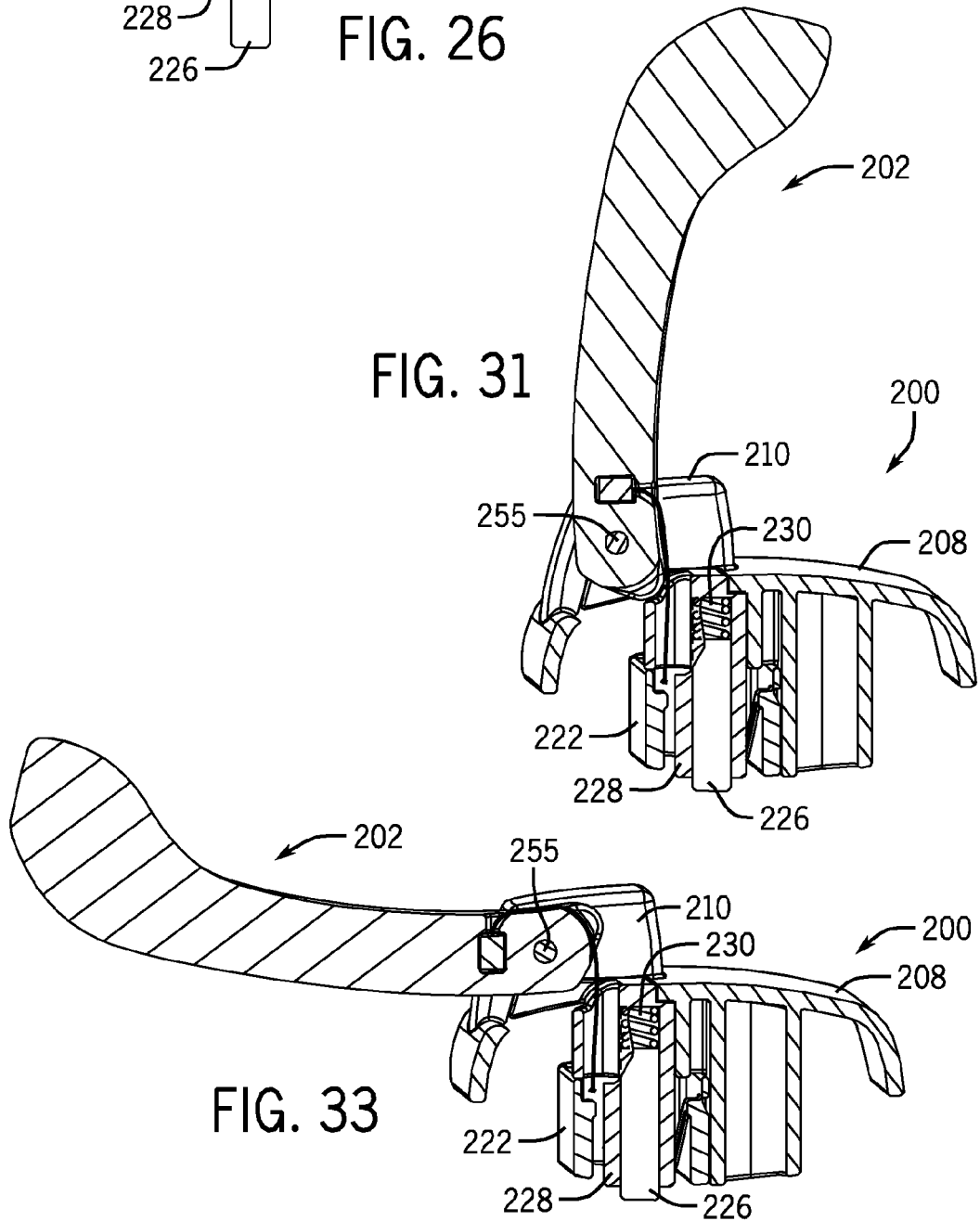

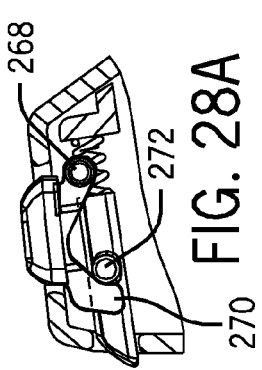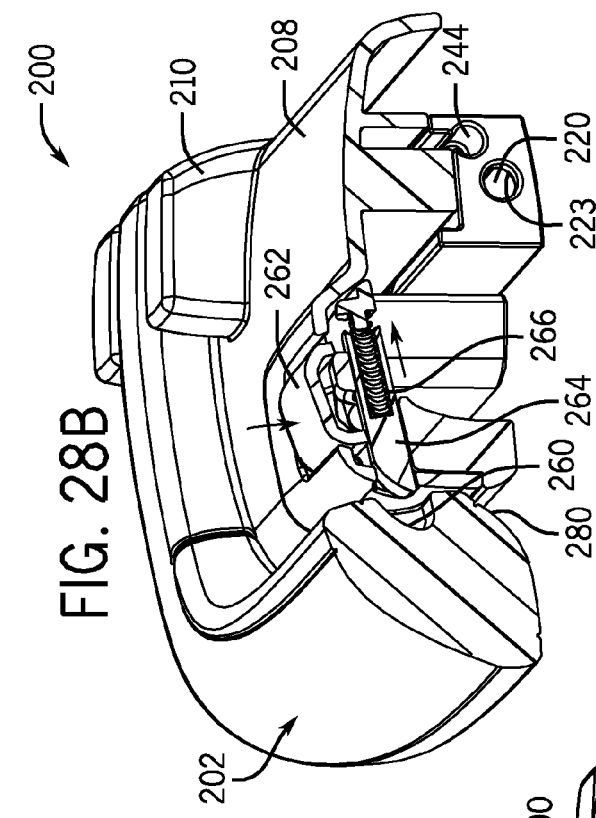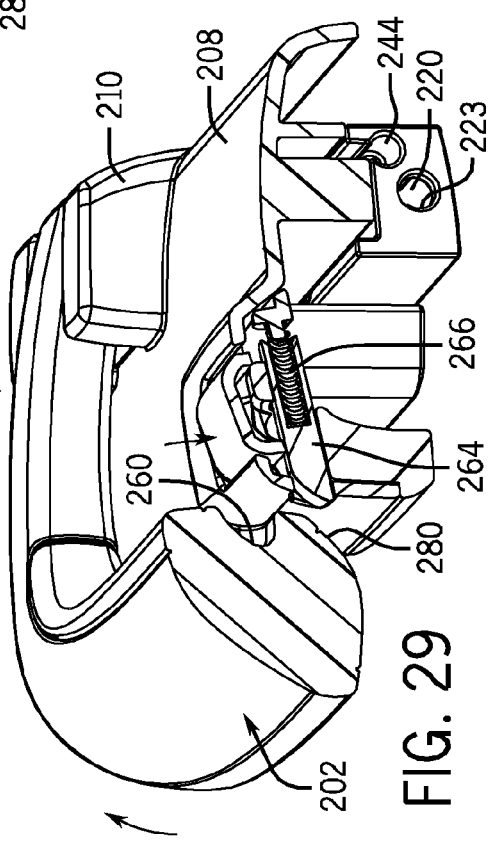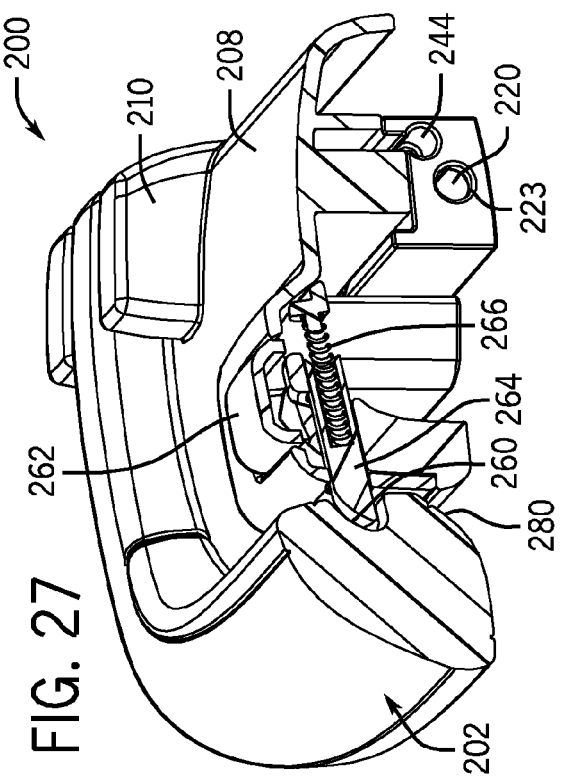

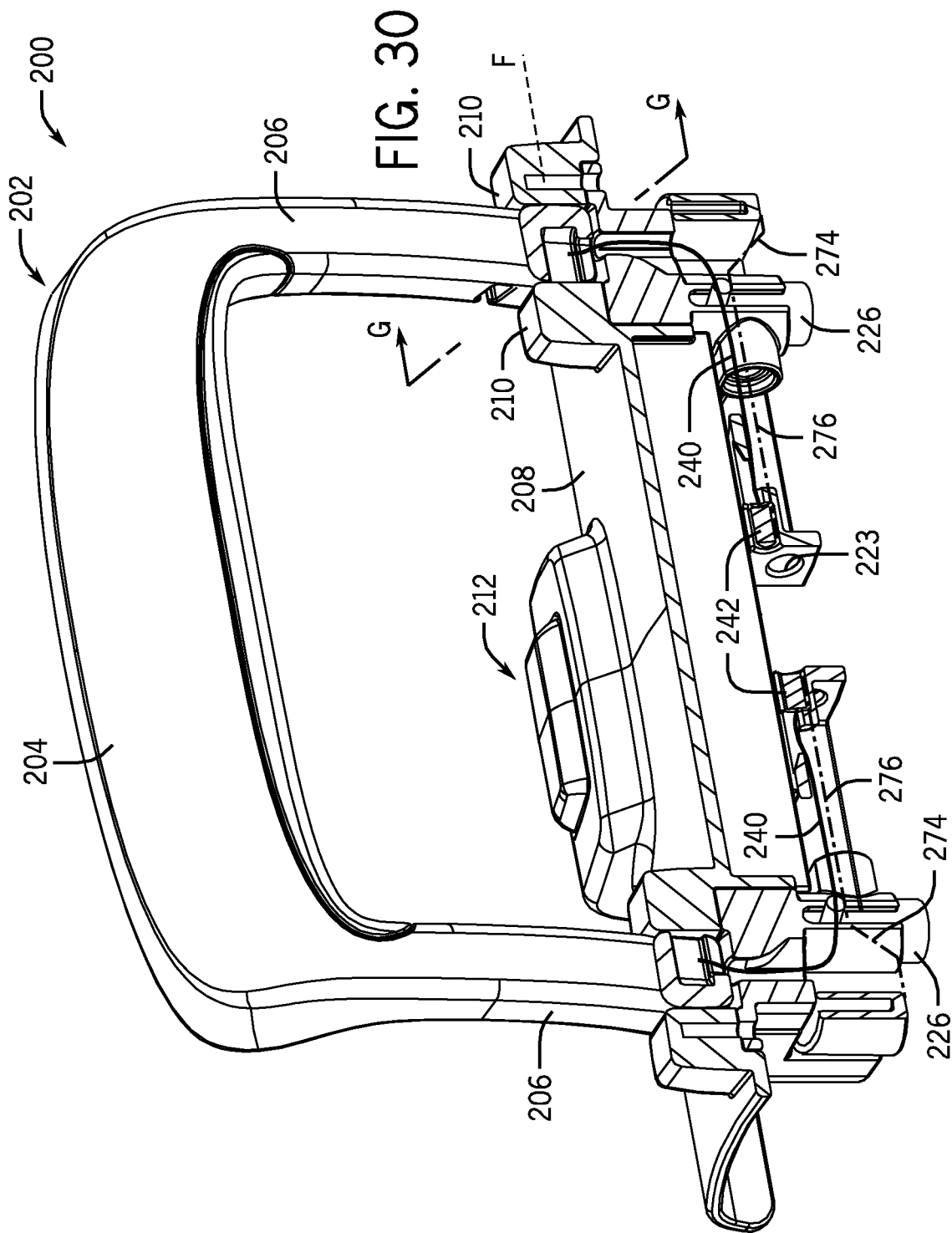

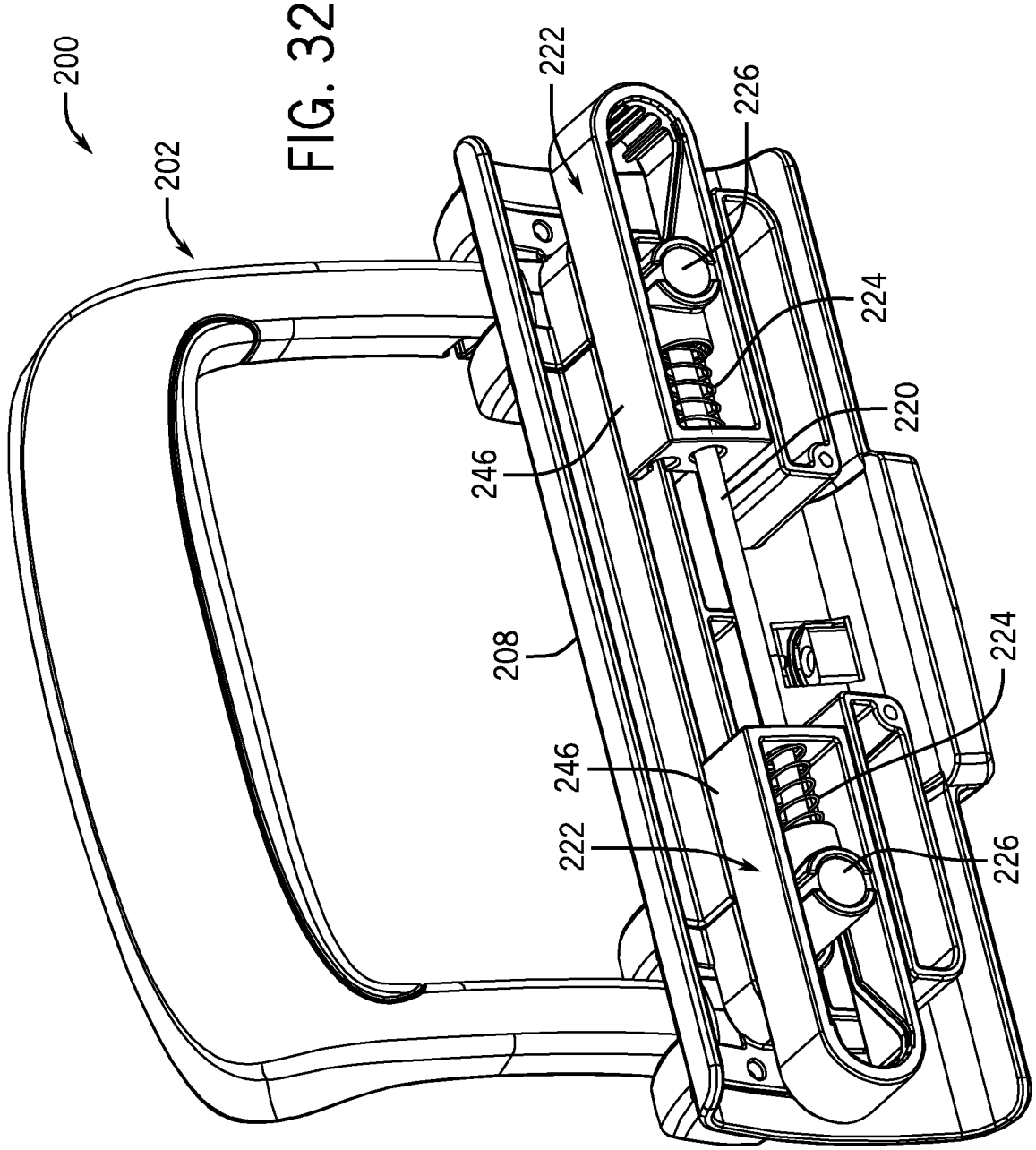

STORAGE LATCH AND REVERSIBLE HANDLE FOR A STROLLER

RELATED APPLICATION DATA

This patent is related to and claims priority benefit of U.S. provisional patent application Ser. Nos. 61/085,760 entitled "Storage Latch Mechanism and Handle for a Stroller" and 61/085,796 entitled "Stroller Fold Latch," each of which was filed on Aug. 1, 2008. The entire contents of these earlier filed applications are hereby incorporated by reference.

BACKGROUND

1. Field of the Disclosure

The present invention is generally directed to strollers and stroller handles, and more particularly to a stroller handle that is reversible, can move to a stowed position, and/or actuate a storage latch mechanism for the stroller.

2. Description of Related Art

Foldable strollers are known in the art. A typical stroller has a frame with pivot joints that allow the frame to be reconfigured between a compact, folded configuration and a set-up or in-use configuration for normal use. The typical stroller also has a handle with a pair of spaced apart push bars that extend from the stroller frame and a handle bar that extends between and connects the free ends of the push bars. The handle is typically positioned in a normal or forward use position behind the occupant seat on most strollers for pushing the stroller in a forward direction.

Some strollers are known to have a reversible handle. On such strollers, the push arms and handle bar can be repositioned from the normal or forward use position behind the seat to a reverse use position in front of the occupant seat. In the reverse handle position, the stroller can be pushed backwards in a direction opposite the normal use direction. This can place the caregiver in direct view of the seat and seat occupant during use of the stroller. The handle is typically retained or locked in place in either of these two optional, user selectable positions.

When folded, many strollers have a storage latch that helps retain the stroller in the folded configuration until unlatched. A typical storage latch includes a resilient or movable latch part or finger on one stroller frame component and a catch part or protrusion on an adjacent frame component when the frame is folded. On some strollers, the latch part or finger engages the catch part automatically when the stroller is folded and must be manually released from the catch part to unfold the stroller. On many strollers, the storage latch is more rudimentary such that the latch part must be manually engaged with and disengaged from the catch part. On many such strollers, the catch part is a fixed pin that projects from a frame tube and the latch part is a flexible plastic hook pivotally mounted to another frame tube.

Operating the storage latch on some strollers can be difficult. Many such storage latches are located on or near the rear leg pivot on the stroller frame. It can be difficult to reach and grip the latch part during folding or unfolding of the stroller. It can also be difficult to manipulate portions of the folded stroller frame to cause or allow release of the latch part from the catch part. Additionally, a typical storage latch design can require multiple steps to engage, disengage, or both when operating the stroller. It is also possible for a user to catch or pinch a finger while latching or unlatching this type of conventional storage latch.

Nearly every stroller in the marketplace today is foldable in some manner. As a result, virtually every stroller also employs some type of fold latch mechanism and a fold actuator to operate the latch mechanism. A typical stroller has two generally parallel frame sides and a fold latch on each side of the frame. The fold latches are configured to retain the stroller frame in the set-up or in-use configuration. Unlatching the fold latches typically allows the stroller frame to be reconfigured to the folded configuration. The one or more fold actuators are actuated to unlatch the stroller's fold latches to permit the stroller to be reconfigured from an in-use configuration to the folded configuration.

The typical stroller frame has a geometry that is created by the two parallel frame sides. Each frame side typically has a front leg, a rear leg, and a handle or push bar. The push bars typically are joined at their free ends by a handle. The frame sides are also connected by one or more transverse cross-members to create a study frame structure. Each frame side often has a fold latch mechanism generally located at a pivot joint connecting frame parts on that frame side. Some strollers have a dedicated fold actuator on or near each of the fold latches. Other strollers have a single fold actuator that can operate both fold latches simultaneously. Thus, the overall fold latch mechanism is typically tied to at least one, and sometimes more than one, fold actuator. The actuator or actuators are often conveniently located somewhat close to the operator, such as on or near the handle. The actuator is operated in order to unlock the fold latching mechanisms so that stroller can be folded.

On many strollers, the fold actuator is positioned on the handle, which can result in a user contacting the fold actuator during normal stroller usage. It is thus possible for a user to inadvertently actuate the fold latch or latches while pushing or maneuvering the stroller. Most strollers as a result also employ a secondary locking mechanism of some type on the fold actuator, which retains the fold actuator in a latched position to prevent such inadvertent actuation. The secondary locking mechanism must first be actuated in order to move the fold actuator to unlatch the fold latch or latches.

In addition, a folded stroller frame can be awkward and inconvenient to carry. Once folded, the structure, though generally compact, is still rather bulky. If a user grabs one side of the folded frame assembly, the various fold joints may be subjected to undue stress as the user carries the stroller. If a user grabs one end of the folded structure, the structure may unfold, unless a stout storage latch is employed. Also, the folded structure may still be rather lengthy, even when folded, making it difficult to carry from one end unless the user is a taller person.

SUMMARY

In one example according to the invention, a storage latch mechanism for a foldable stroller has a frame assembly with a chassis and a handle. The frame assembly is reconfigurable between an in-use configuration and a folded configuration and the handle is movable between a normal use position and a stowed position relative to the chassis. The storage latch has first and second storage latch parts carried on the frame assembly. The first and second latch parts are latched to one another with the frame assembly in the folded configuration and unlatched from one another in the in-use configuration. Movement of the handle to the stowed position frees the storage latch mechanism to latch and movement of the handle from the stowed position to the normal use position unlatches the storage latch mechanism.

In one example of a storage latch mechanism according to the invention, the first latch part can be a storage pin and the second latch part can be a receptacle sized to receive the storage pin. The storage pin can be retracted from the receptacle in an unlatched condition and extended into the receptacle in a latched condition.

In one example of a storage latch mechanism according to the invention, the first latch part can be a storage pin and the second latch part can be a receptacle. The storage pin can be biased to a latched condition within the receptacle and can be connected to one end of a cable that, when actuated, can move the storage pin to an unlatched condition retracted from the receptacle. An opposite end of the cable can be coupled to a part of a handle pivot joint.

In one example of a storage latch mechanism according to the invention, the storage latch mechanism can include a cable connected between a handle pivot joint of the handle and the first latch part and a storage cam positioned within the handle pivot joint that can rotate in concert with movement of the handle to actuate the cable to unlatch the first latch part.

In one example of a storage latch mechanism according to the invention, the first latch part can be biased toward a latched condition.

In one example according to the invention, a foldable stroller frame assembly has a chassis and a handle coupled to the chassis. The frame assembly can be reconfigurable between an in-use configuration and a folded configuration and the handle can be movable between a normal use position and a stowed position relative to the chassis. A storage latch mechanism can be carried on the frame assembly and be capable of being latched with the frame assembly in the folded configuration to retain the folded configuration and of being unlatched with the frame assembly in the in-use configuration. Movement of the handle to the stowed position can free the storage latch mechanism to latch and movement of the handle to the normal use position can unlatch the storage latch mechanism.

In one example of a frame assembly according to the invention, the chassis can be folded with the handle in the normal use position. In one example according to the invention, the storage latch does not latch until the handle is moved to the stowed position.

In one example of a frame assembly according to the invention, the handle can be moved to the stowed position with the chassis still in the in-use configuration. In one example according to the invention, the storage latch can be ready to latch but unable to latch until the chassis is folded to the folded configuration.

In one example of a frame assembly according to the invention, the handle can be moved to a reverse handle position intermediate the normal use position and the stowed position.

In one example of a frame assembly according to the invention, the storage latch mechanism can be unlatched with the handle in the normal use and a reverse handle position. Movement of the handle from the stowed position to the reverse handle position can unlatch the storage latch mechanism.

In one example of a frame assembly according to the invention, the chassis can include a front wheel section and a rear wheel section pivotally connected to one another. The first latch part can be carried on the front wheel section and the second latch part can be carried on the rear wheel section.

In one example of a frame assembly according to the invention, the first latch part can be a storage pin and the second latch part can be a receptacle sized to receive the storage pin. The storage pin can be retracted from the receptacle in an unlatched condition and can be extended into the receptacle in a latched condition.

In one example of a frame assembly according to the invention, the first latch part can be a storage pin and the second latch part can be a receptacle. The storage pin can be biased to a latched condition within the receptacle and can be connected to one end of a cable that, when actuated, can move the storage pin to an unlatched condition retracted from the receptacle. In one example of a frame assembly according to the invention, an opposite end of the cable can be coupled to a part of a handle pivot joint of the handle.

In one example of a frame assembly according to the invention, the storage latch mechanism can include a storage cam positioned within a handle pivot joint of the handle. The storage cam can rotate in concert with movement of the handle to unlatch the first latch part. The first latch part can be biased toward a latched condition.

In one example of a frame assembly according to the invention, a fold latch mechanism can be positioned between left and right sides of the chassis and can be configured for latching first and second wheel sections of the chassis in the in-use configuration.

BRIEF DESCRIPTION OF THE DRAWINGS

Objects, features, and advantages of the present invention will become apparent upon reading the following description in conjunction with the drawing figures, in which:

FIG. 7A shows an outside view of the left side handle pivot joint in FIG. 6 in a latched configuration and with the joint cover and handle cover removed.

FIG. 7B shows an outside view of the left side handle pivot joint in FIG. 7A but in an unlatched configuration.

FIG. 26 shows a cross-section of a fold latch assembly taken along line D-D in FIG. 25.

FIG. 27 shows a cross-section of the fold latch assembly taken along line E-E in FIG. 22.

FIG. 28A shows a cross-section of the secondary latch taken along line F-F in FIG. 22.

FIG. 28B shows the cross-section of the fold latch assembly in FIG. 27, but with the secondary latch disengaged.

FIG. 29 shows the cross-section of the fold latch assembly in FIG. 28B, but with a latch release handle pivoted upward to clear the secondary latch.

FIG. 30 shows the cross-section of the fold latch assembly in FIG. 25, but with the latch release handle pivoted to a 90° release position relative to the latched position.

FIG. 31 shows a cross-section of the fold latch assembly in the 90° release position taken along line G-G in FIG. 30.

FIG. 32 shows the bottom view of the fold latch assembly in FIG. 23, but with the latch release handle in a 180° release position from the latched position.

FIG. 33 shows a cross-section of the fold latch assembly in the 180° release position taken along line H-H in FIG. 32.

DETAILED DESCRIPTION OF THE DISCLOSURE

Figure 1:
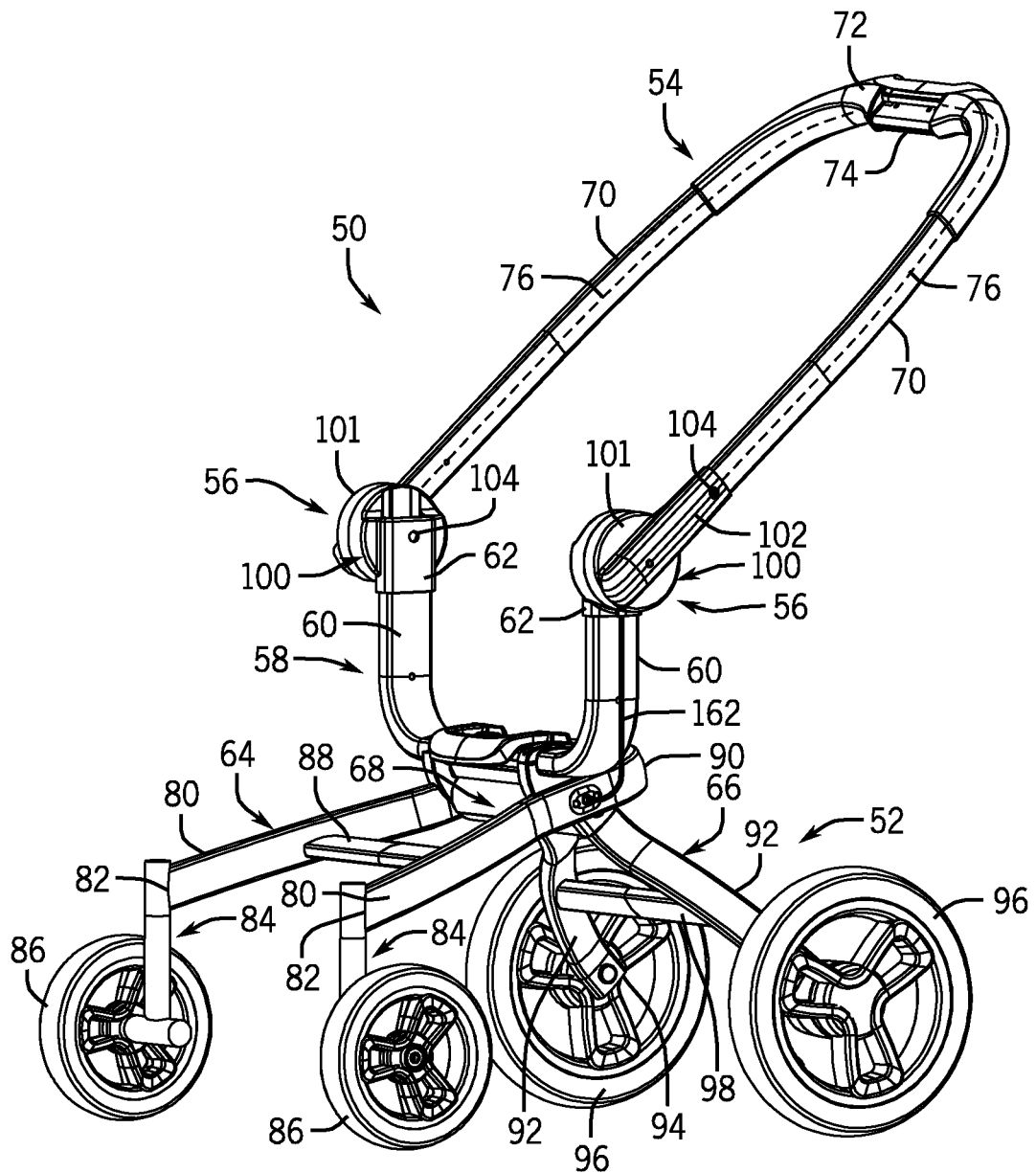
FIG. 1 shows a perspective view of one example of a stroller frame assembly constructed in accordance with the teachings of the present invention and with the handle in a normal use position.

The disclosed stroller frame assembly solves or improves upon one or more of the above-noted and/or other problems and disadvantages with prior art stroller frames, storage latches, and fold latches for strollers. In one example, the disclosed stroller frame assembly has a chassis and a handle that is movable relative to the chassis. The disclosed frame assembly has a handle that can change position, a handle latch mechanism for retaining the handle in a selected position, and a storage latch mechanism operable by movement of the handle. In one example, movement of the handle to a stowed or folded position relative to the chassis frees a storage latch, allowing it to latch or to become engaged in order to retain the stroller frame assembly in a folded configuration when folded. In one example, movement of the handle to a normal use position relative to the chassis disengages or unlatches the storage latch in order to free the stroller frame assembly to be unfolded or reconfigured to an in-use or set-up configuration. In one example, the disclosed handle is movable relative to the chassis between a normal use position, a reverse position, and a stowed, storage, or folded position. In one example, the disclosed storage latch automatically engages or disengages, i.e., latches or unlatches, solely by movement of the stroller handle and thus does not require manual latching or unlatching of the storage latch directly.

The disclosed stroller frame assembly also has a fold latch mechanism that is configured to accommodate a unique stroller frame configuration. There is currently no other known stroller on the market that has a frame geometry similar to the stroller frame assembly disclosed herein. The disclosed frame assembly is considered unique in that it does not include the usual left and right parallel frame sides with separate and discrete pivot joints and latches on each side. The disclosed stroller frame assembly employs unified front leg and rear leg structures that are connected to one another at a single pivot point or chassis joint located above and centrally between the front and rear wheels and beneath the stroller seat. The disclosed fold latch mechanism is located under the seat and, thus, the seat occupant. This eliminates the need to employ two separate fold latches, one on each of left and right frame sides. The disclosed fold latch mechanism includes both latching capability and latch release capability right at the frame joint.

The disclosed fold latch mechanism provides or meets a number of basic attributes or objectives. One, the fold latch mechanism, and thus the release function, is configured to be located above the main central pivot point of the front and rear leg structures for convenient access by the operator. Two, the fold latch mechanism is configured so that the stroller can be lifted and thus folded via a release handle of the mechanism to impart folding of the frame and for carrying the folded product. Three, the components of the fold latch mechanism positioned and configured to be entirely unobtrusive during normal stroller usage and so as to not be easily and inadvertently disengaged during normal stroller usage. Four, the disclosed fold latch mechanism is configured to comply with current safety standards, which require an operator to apply two separate motions or operations to release or activate the fold latch.

In one example, the disclosed stroller frame assembly has a fold latch mechanism positioned between the frame sides and beneath the location of a stroller seat. In one example, the fold latch mechanism has a latch release handle and latches or retains the frame assembly in the in-use configuration. In one example, the latch release handle can be moved to a release position to unlatch or disengage the fold latch mechanism in order to permit the stroller frame assembly to be folded or reconfigured to the folded configuration. In one example, the chassis has a front wheel section and a rear wheel section that pivot relative to one another along a pivot axis oriented transversely between the frame sides. The fold latch mechanism is positioned centrally between the frame sides on the pivot axis. The fold latch mechanism is not positioned on the handlebar or the handle grips of the stroller and thus will not be inadvertently actuated during normal use of the stroller. The fold latch mechanism is also neither positioned nor exposed on either side of the stroller frame assembly. Again, the fold latch mechanism will not likely be inadvertently actuated during normal use of the stroller.

Turning now to the drawings, FIG. 1 shows one example of a stroller frame assembly 50 constructed in accordance with the teachings of the present invention. In this example, the frame assembly 50 generally has a left and a right side and a front end and a rear end. The frame assembly 50 has a chassis 52 and a handle 54 pivotally coupled to the chassis at a pair of spaced apart handle pivot joints 56. The disclosed chassis 52 has a U-shaped seat mount 58 with a pair of spaced apart, upstanding, left and right seat mounting posts 60 that terminate at exposed upper ends 62. The chassis 52 in this example also includes a front wheel section 64 and a rear wheel section 66 coupled to one another at a central chassis joint 68 that extends transversely between the left and right frame sides. The seat mount 58 is carried on and projects upward from the central chassis joint 68 in this example.

A stroller seat assembly would ordinarily be mounted to the upper ends 62 of the mounting posts 60 in this example. However, the stroller seat is not shown herein so as to more easily show other components and aspects of the frame assembly 50. In general, the stroller seat would have opposed sides that would mount to the upper ends 62 of the mounting posts 60. Thus, the seat assembly would be positioned between the mounting posts 60 above the chassis joint 68. In other examples, the frame assembly 50 can be configured so that other optional seating devices can be removably mounted to the seat mount 58, such as an infant seat, an infant car seat or carrier, and/or a bassinet or carrycot. The seat mount 58 can be configured to removably attach or mount a seat assembly or other such seating device so as to render the stroller frame assembly a part of a modular stroller system or travel system.

The handle 54 in this example generally has a pair of push arms or push bars 70 with upper ends interconnected by a transverse handlebar 72. Each of the push bars 70 also has a lower end pivotally connected to one of the handle pivot joints 56, which are carried on or near the upper ends 62 of the mounting posts 60. The handle 54 can be of a lightweight tubular metal construction, but is certainly not limited to any type of materials or particular structural configuration. The handle 54 can vary in configuration and construction from the examples shown and described herein. In this example, a handle actuator 74 is positioned on the handlebar 72 and is coupled by cables 76 routed from the actuator through the tubular push bars 70 to the handle pivot joints 56. The handle actuator 74 can be a linear pull-type actuator that is gripped and pulled toward the handlebar 72, a rotating-type actuator that is gripped and rotated relative to the handlebar, or the like. Such actuators are known in the art for providing certain functions such as collapsing and/or folding a stroller. Thus, the handle actuator 74 is not described in any detail herein, as one having ordinary skill in the art would understand the function and various configurations and components for such a conventional actuator.

In the disclosed example, the front wheel section 64 of the chassis 52 is generally U-shaped and includes a pair of spaced apart, left and right side, front legs 80, which terminate at forward or free ends 82. A front wheel assembly 84, including at least one front wheel 86, is mounted to a free end 82 of each of the front legs 80. The front wheel section 64 also includes a cross brace 88 that extends between the front legs 80 and spaced rearward of the front wheel assemblies 84. The cross brace 88 is configured to add structural integrity and stability to the front wheel section. The rear ends of the front legs 80 continue into an integral crossbar 90 that is positioned at rearward of the chassis joint 68 in this example and that interconnects the front legs 80. Also in this example, the front wheel section 64 is fixed relative to the chassis joint 68. However, in other examples, the front wheel section could be pivotally movable relative to the chassis joint, if desired. As will be evident to those having ordinary skill in the art, the configuration and construction of the front wheel section 64 can vary within the spirit and scope of the present invention from the example shown and described herein.

The rear wheel section 66 of the chassis 52 in this example has a pair of spaced apart, left and right side, rear legs 92, which terminate at rearward or free ends 94. A rear wheel 96 is rotatably connected to each of the free ends 94 of the rear legs 92. The rear wheel section 66 also includes a structural cross brace 98 spaced upward from the free ends 94 and extending between the rear legs 92. In this example, each of the rear legs 92 has an upper end that is pivotally connected relative to the front wheel section 64 at the chassis joint 68. Details of the rear leg connection to the chassis joint are described in greater detail below. As will be evident to those having ordinary skill in the art, the configuration and construction of the rear wheel section 66 can also vary within the spirit and scope of the present invention from the example shown and described herein.

Figure 2:
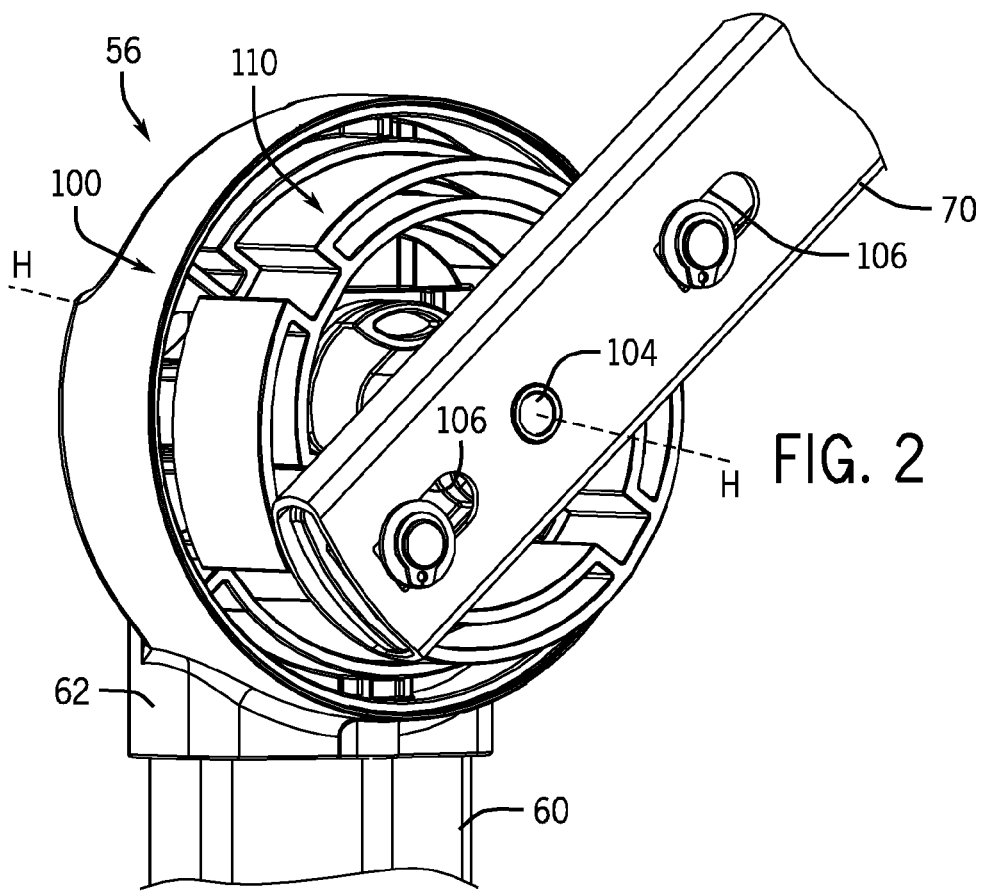
FIG. 2 shows the left side handle pivot joint of the frame assembly and handle in FIG. 1 with a handle cover and a joint cover removed.
Figure 3A:
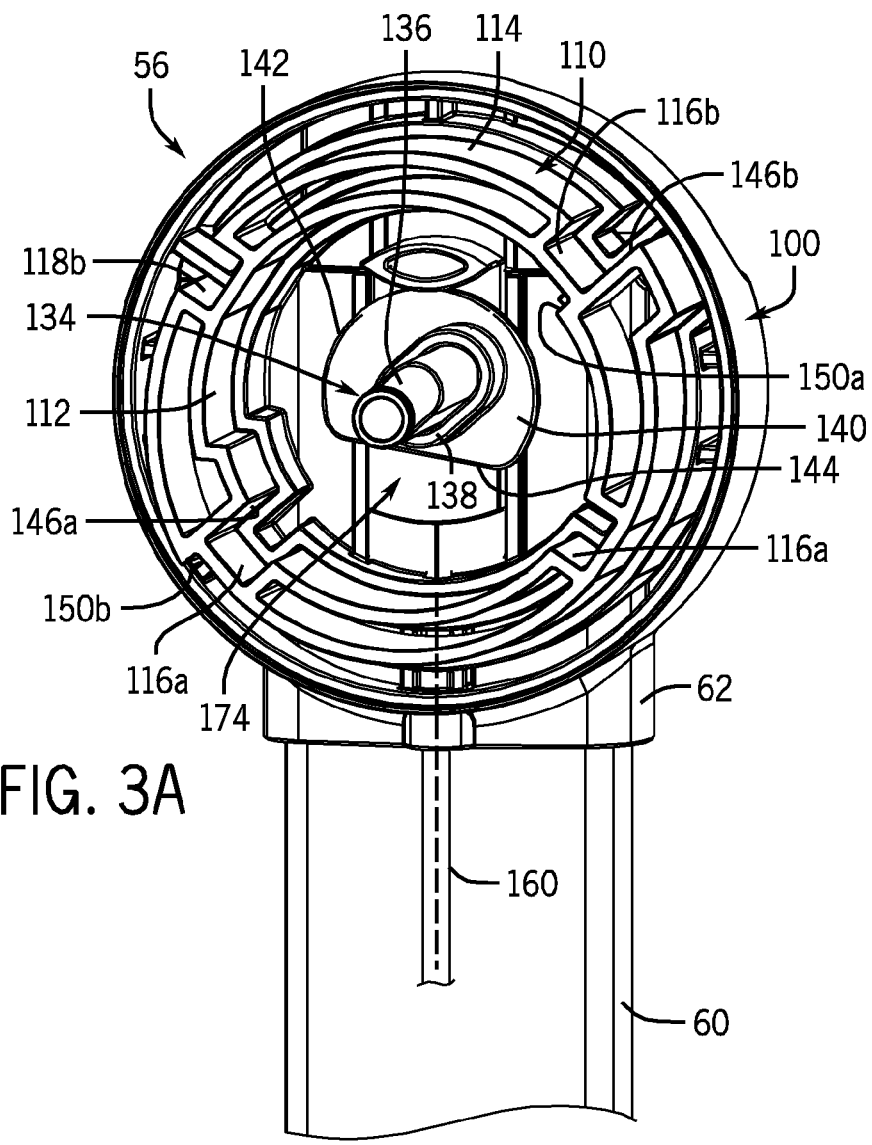
FIG. 3A shows the left side handle pivot joint of the frame assembly and handle in FIG. 2 with the handle removed.

Details of the handle pivot joints 56 are now described with reference to FIGS. 2, 3A, and 3B. The left side pivot joint 56 is shown in FIG. 2 and is described herein. It is to be understood that the right side pivot joint 56 can essentially be a mirror image of or functionally identical to the left side in this example. It is also to be understood that the below-described storage latch aspects of the pivot joint 56 need not be provided on both of the joints. In this example, the handle pivots provide a handle latch mechanism function and a storage latch mechanism function. The pivot joint 56 has a housing 100 carried on the upper end 62 of the seat mounting posts 60. With reference to FIGS. 1 and 2, a housing cover 101 of the housing 100 and an end cover 102 of the handle push bar 70 have been removed to expose the internal workings of the pivot joint 56. A pivot pin 104 defines a horizontal pivot axis H through the pivot joint 56 and pivotally connects the push bar 70 to the joint. A pair of slots 106 is formed through each surface of the tubular push bar 70. Each pair of slots is positioned on opposite sides of a pivot opening through which the pivot pin 104 extends. A positioning ring 110, as best shown in FIG. 3A, is housed within the housing 100 and defines a plurality of selectable home positions for the handle 54 in this example. The ring 110 is concentric with the pivot axis H and has an interior or inner circumferential surface 112 and exterior or outer circumferential surface 114. A first opposed pair of positioning ways or notches is formed in the ring, with an inner notch 116a of the pair formed in the inner surface 112 and an outer notch 116b of the pair formed in the outer surface 114. A second opposed pair of positioning ways or notches is formed in the ring 110 and angularly or rotationally displaced from the first pair 116a, 116b. The second pair of ways includes an inner notch 118a in the inner surface 112 and an outer notch 118b in the outer surface 114 of the ring 110.

Figure 3B:
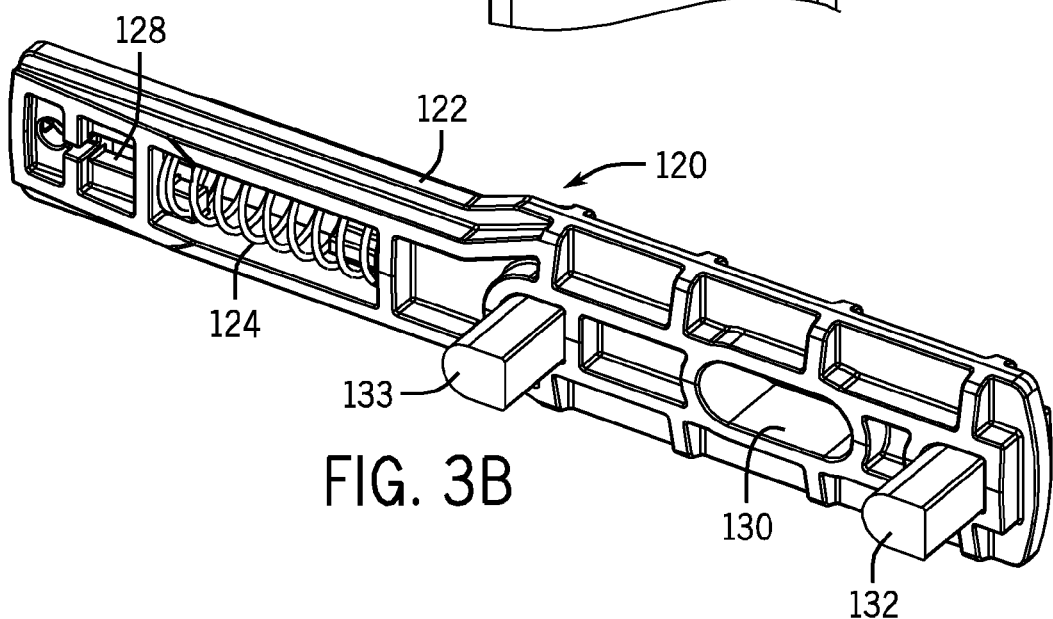
FIG. 3B shows an internal shuttle of the handle in FIGS. 1 and 2.

A handle latch shuttle 120 is telescopically and slidably received in an open end 121 of the push bar 70 and is best depicted in FIG. 3B. The shuttle 120 has an elongate body structure 122. A spring 124 is captured within one end of the body 122 and biases the shuttle 120 outward toward the open end 121 of the push bar 70. The one end of the body 122 is connected to the cable 76, which has a slug 126 on the cable end seated in a slotted orifice 128 of the body. The other end of the body 122 has a lengthwise oriented cam slot 130 and a pair of keys or studs 132, 133 that project outward from the body. The studs 132, 133 are positioned adjacent and spaced from opposite ends of the cam slot 130 and are sized and shaped to seat in each of the pair of the positioning notches 116a, 116b and 118a, 118b in the positioning ring 110.

The latch shuttle 120 and the positioning ring 110 create a handle latch mechanism. The mechanism retains the handle 54 in a selected handle position when latched or engaged. The mechanism also permits the handle to move and be repositioned relative to the chassis, and particularly the seat mount 58, when unlatched or disengaged.

Returning to FIG. 3A, a storage cam 134 is also pivotally mounted to the pivot pin 104. The storage cam 134 in this example has a hub 136 through which the pivot pin extends. A cam lobe 138 has an oblong shape and projects radially from the hub 136 relative to the pivot axis H. The cam lobe 138 is sized to fit within the cam slot 130 of the shuttle 120. The non-round or oblong shape of the cam lobe 138 ensures that the cam 134 will rotate as the handle 54 and shuttle 120 rotate about the pivot axis H. In addition, the length of the lobe 138 is shorter than the slot length so that the lobe can translate within the slot, providing clearance to allow the shuttle to move perpendicular and relative to the pivot axis between a latched position and a release or unlatched position. The storage cam 134 also has a cam disc 140 connected to one end of the hub 136 so as to rotate with the cam. The disc 140 has a circumferential surface, a majority of which is a circular segment 142. However, a section of the disc's circumferential surface is cropped to form a flat segment 144.

Figure 4A:
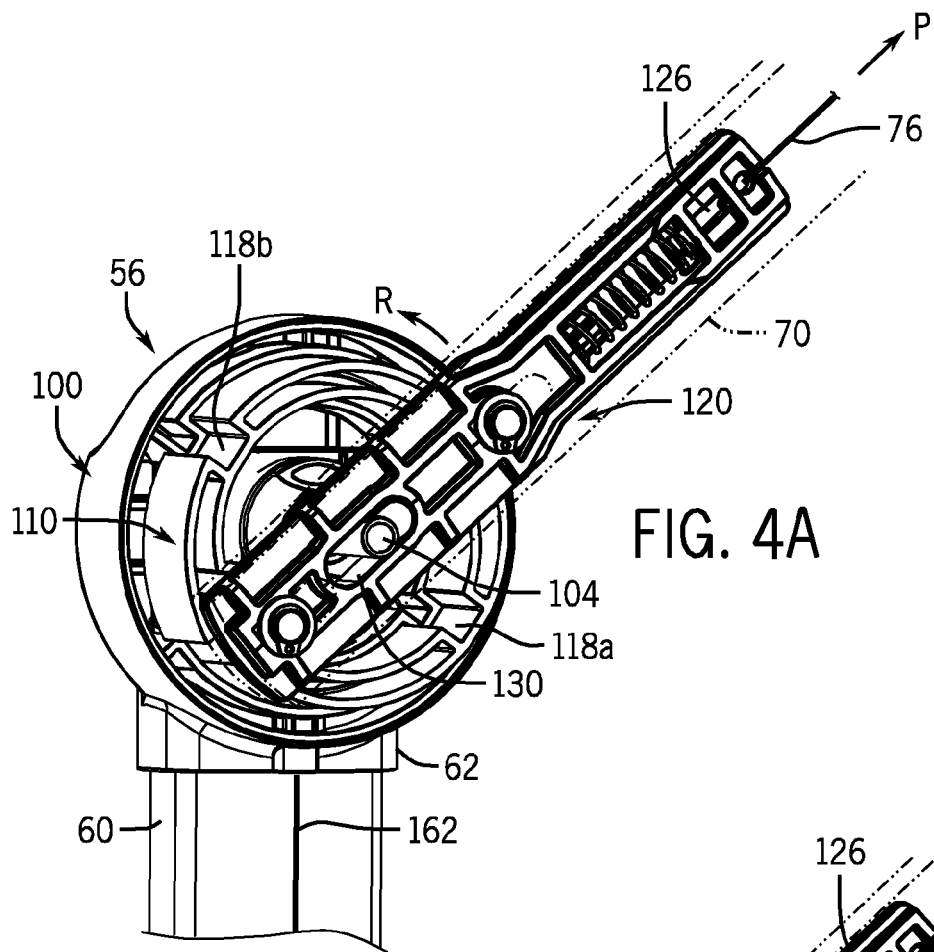
FIG. 4A shows an outside view of the left side handle pivot joint in FIG. 1 in a latched configuration and with the joint cover and handle cover removed.
Figure 4B:
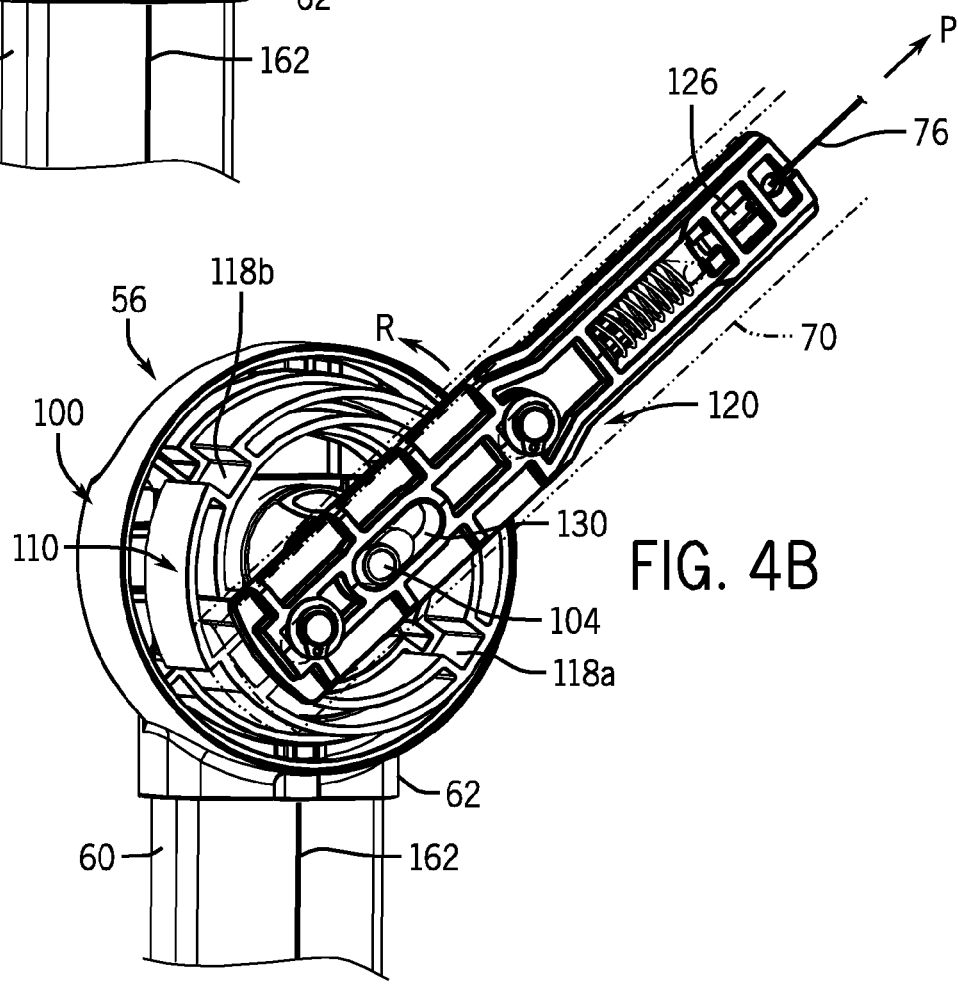
FIG. 4B shows an outside view of the left side handle pivot joint in FIG. 4A but in an unlatched configuration.
Figure 5A:
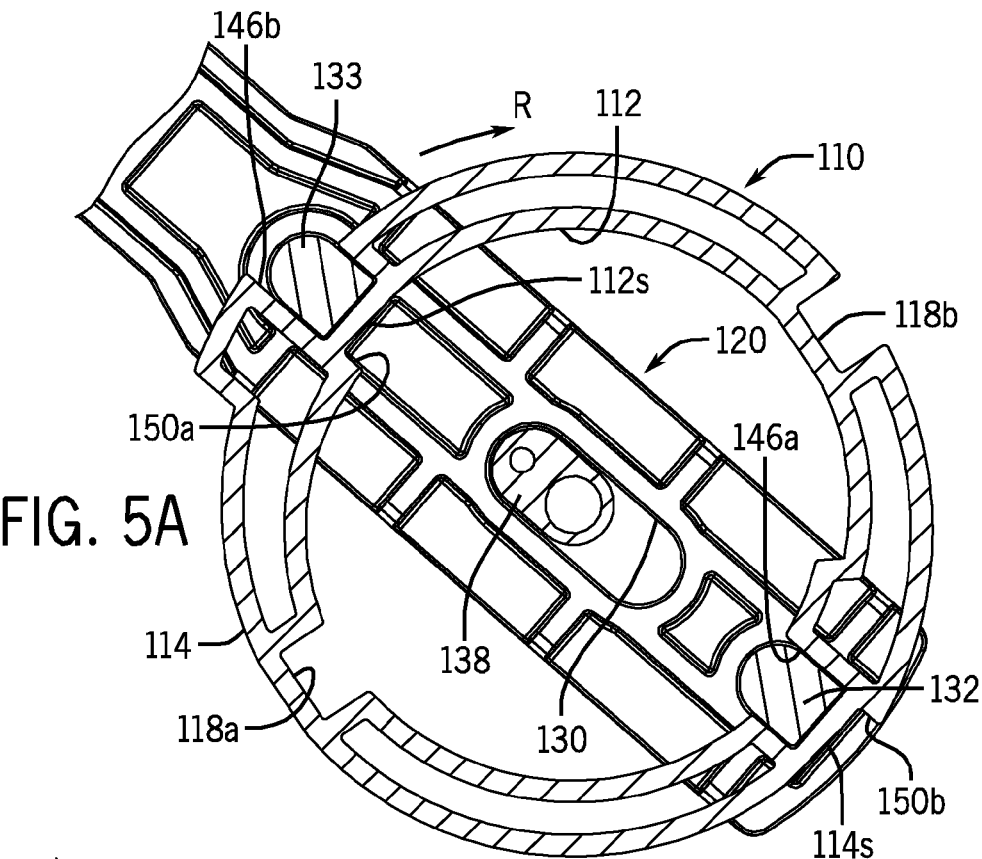
FIG. 5A shows a reverse or inside view of parts of the left side handle pivot joint in FIG. 4A.
Figure 5B:
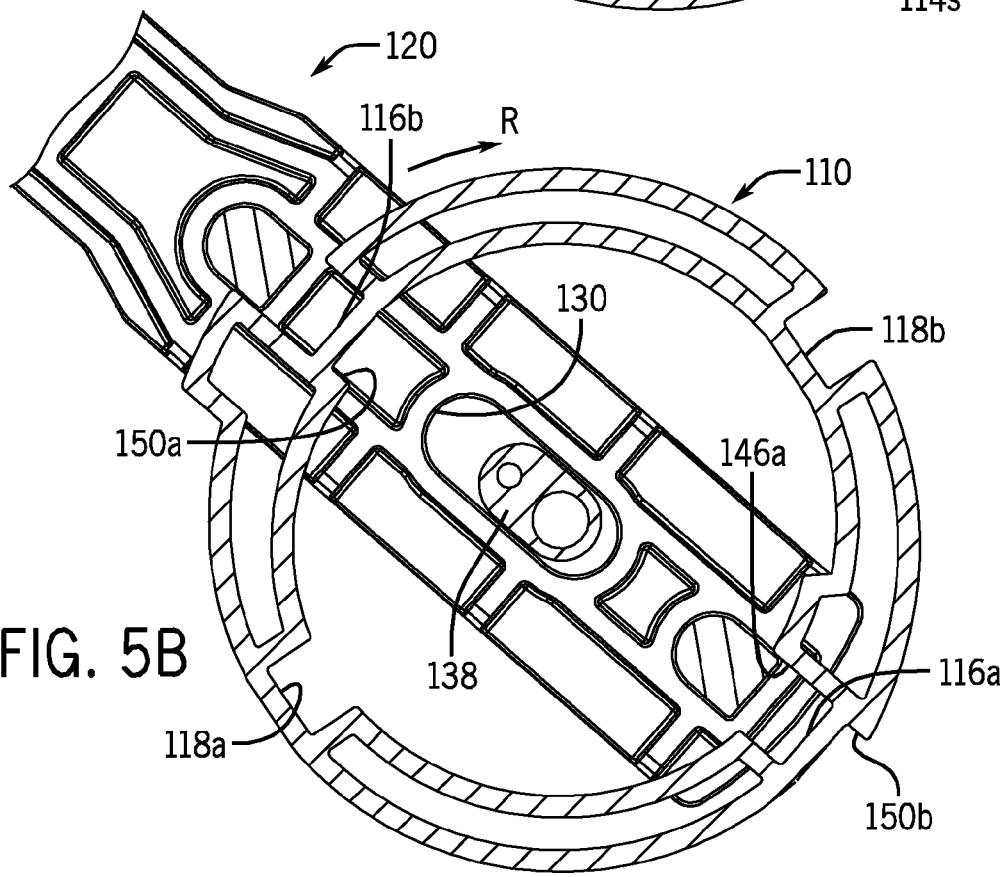
FIG. 5B shows the portion of the left side handle pivot joint in FIG. 5A, but in the unlatched configuration of FIG. 4B.

FIGS. 4A and 5A show the handle latch mechanism in a latched or engaged condition. The spring 124 biases the shuttle 120 downward toward the pivot pin 104 such that the lobe 138 bottoms against one end of the cam slot 130. The studs 132, 133 are positioned to simultaneously bottom within the first pair of positioning notches with the stud 132 seated in the notch 116a and the stud 133 seated in the notch 116b. In order to release the handle, i.e., to unlatch or disengaged the handle latch mechanism, a user actuates actuator 74 on the handle 54 which pulls the cable 76. The cable 76 then withdraws the shuttle 120 upward into the push bar 70 against the bias of the spring 124 as shown in FIG. 4B. The shuttle 120 can move until the cam lobe 138 bottoms against the other end of the cam slot 130. This movement of the shuttle 120 withdraws the studs 132, 133 from the respective positioning notches 116a, 116b as depicted in FIG. 5B. In this released or unlatched condition, the handle 54 is free to rotate about the pivot axis H. However, a directional stop 146a, 146b is respectively positioned bordering one side of each of the notches 116a, 116b. The directional stops 146a, 146b are of sufficient height to prevent the studs 132, 133, when released or withdrawn, from by passing the stops. This prevents rotating the handle 54 from the normal use position shown in FIG. 1 in a downward direction toward the rear wheels 96. However, the studs 132, 133 can travel in the opposite direction away from the stops 146a, 146b. Thus, the handle 54 can be rotated upward away from the rear wheels 96 in the direction of the arrow R depicted in FIGS. 4B and 5B toward a reverse handle position as shown in FIG. 6.

Figure 6:
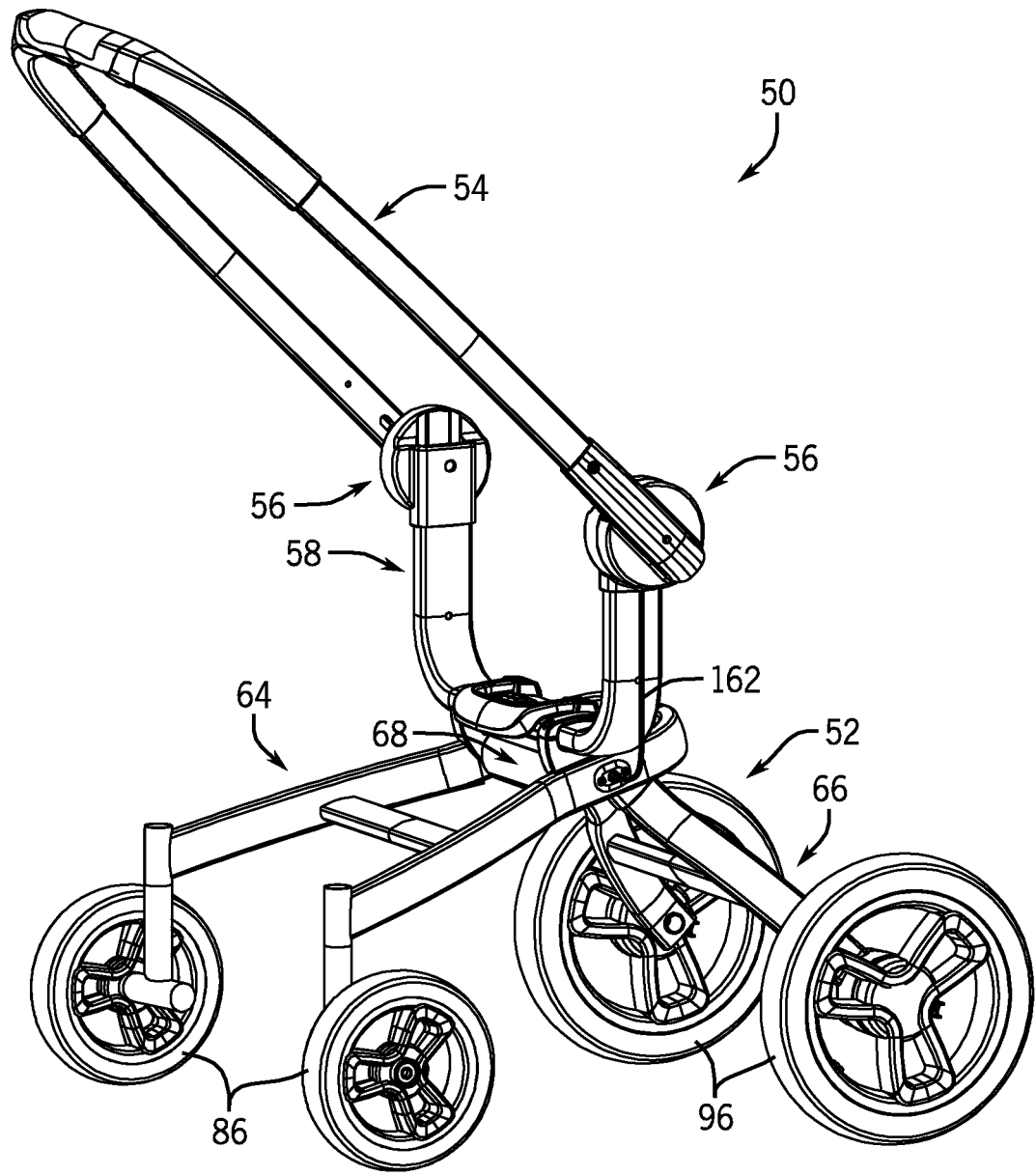
FIG. 6 shows the stroller frame assembly in FIG. 1, but with the handle in a reverse use position.

The handle 54 in the reverse handle position of FIG. 6 would be position forward of the seat instead of behind the seat, as is the handle when in the normal use position of FIG. 1. With the handle 54 in the reverse position, a user can push the stroller with the rear wheels 96 leading and the front wheels 86 trailing. In this direction, the seat occupant would be able to make visual contact with the caregiver pushing the stroller.

Figure 8A:
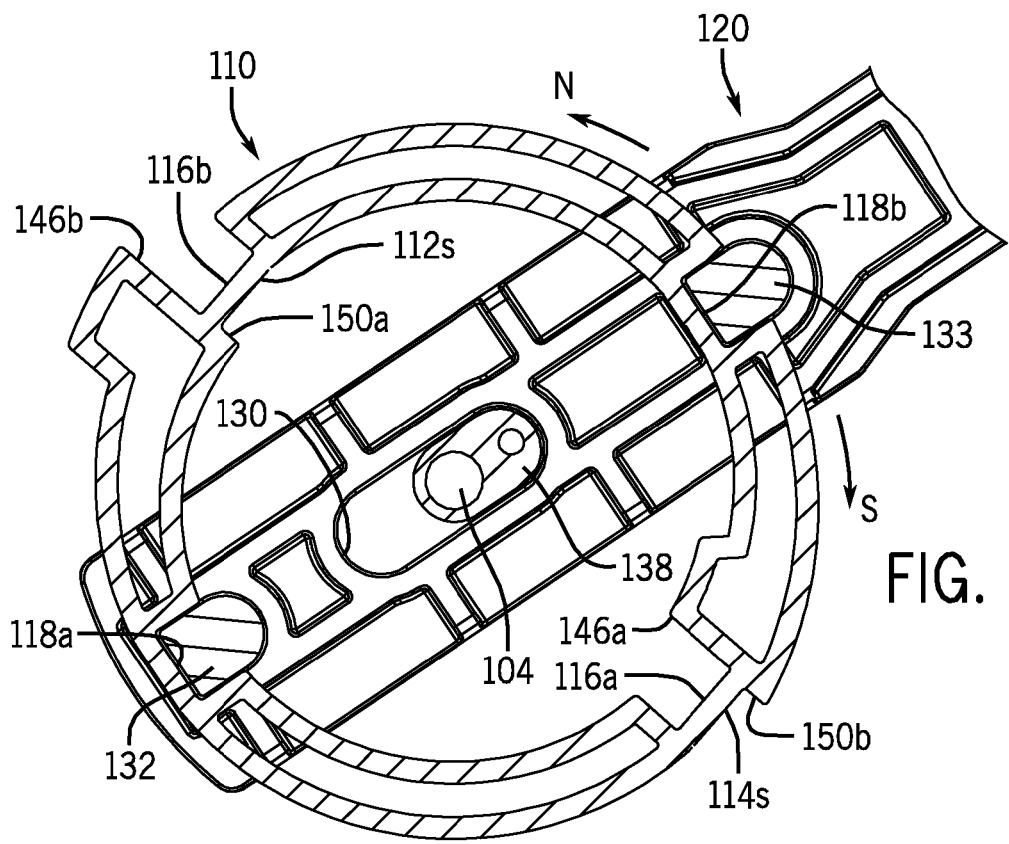
FIG. 8A shows a reverse or inside view of parts of the left side handle pivot joint in FIG. 7A.
Figure 8B:
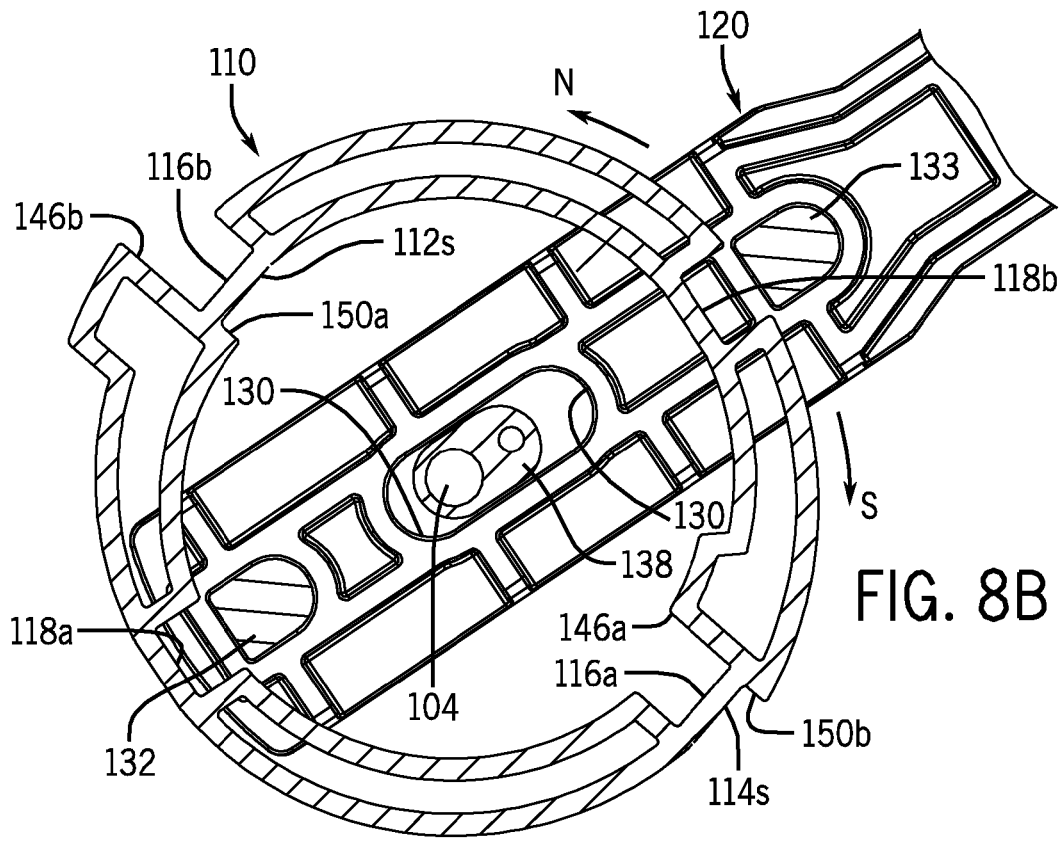
FIG. 8B shows the portion of the left side handle pivot joint in FIG. 8A, but in the unlatched configuration of FIG. 7B.

As the handle 54 is being repositioned from the normal use position in FIG. 1 to the reverse position in FIG. 6, the studs 132, 133 can ride along the surface 112 and 114, respectively, of the positioning ring 110. Upon reaching the positioning notches 118a, 118b, the spring 124 will fire the studs 132, 133 into the notches, which are located on the ring so as to define the reverse handle position. FIGS. 7A and 8A show the handle latch mechanism in a latched or engaged condition with the studs 132, 133 seated in the notches 118a, 118b. By again actuating the actuator 74, the handle latch mechanism will be moved to released or unlatched condition as depicted in FIGS. 7B and 8B. By actuating the actuator 74 and releasing the handle 54, the studs 132, 133 are withdrawn from the reverse position notches 118a, 118b. From this handle position and released latch condition, the handle 54 can be moved in either rotational direction about the pivot axis H. By raising the handle 54 and rotating the handle in the direction of the arrow N, the user can return the handle to the normal use position in FIG. 1.

Figure 9:
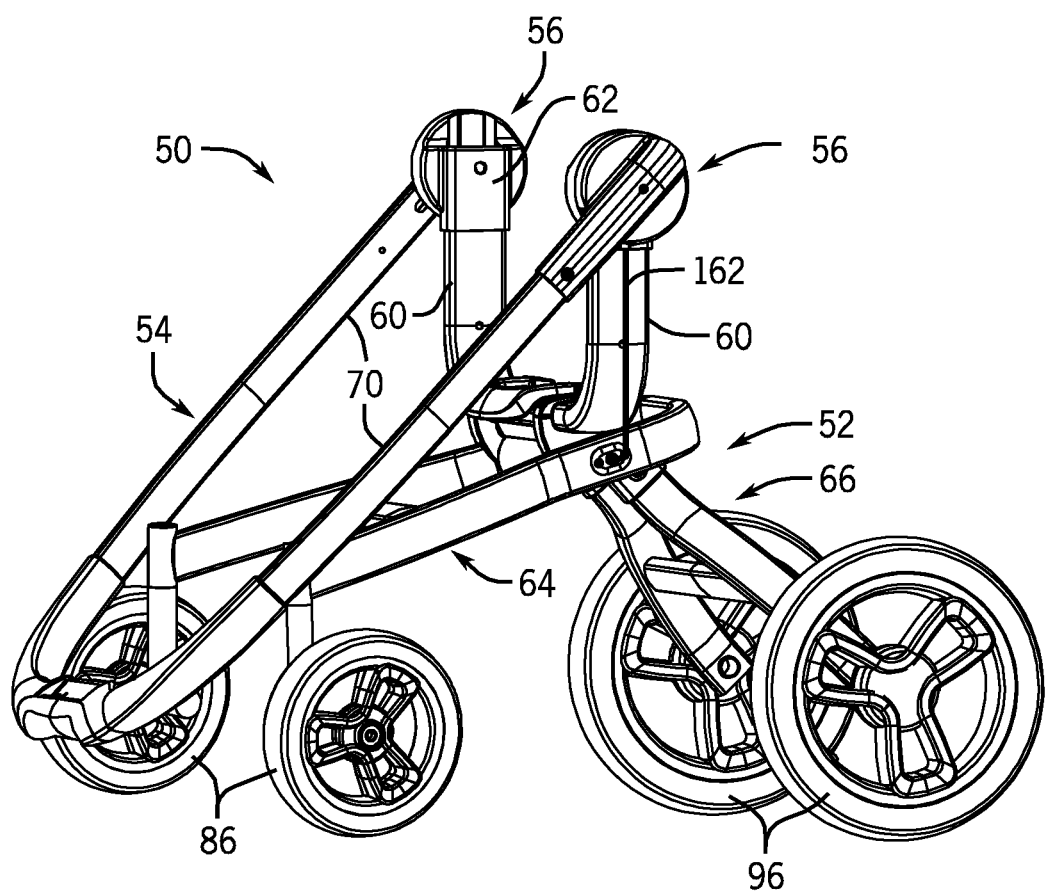
FIG. 9 shows the stroller frame assembly in FIGS. 1 and 5, but with the handle in a lowered, stowed or folded position.
Figure 10:
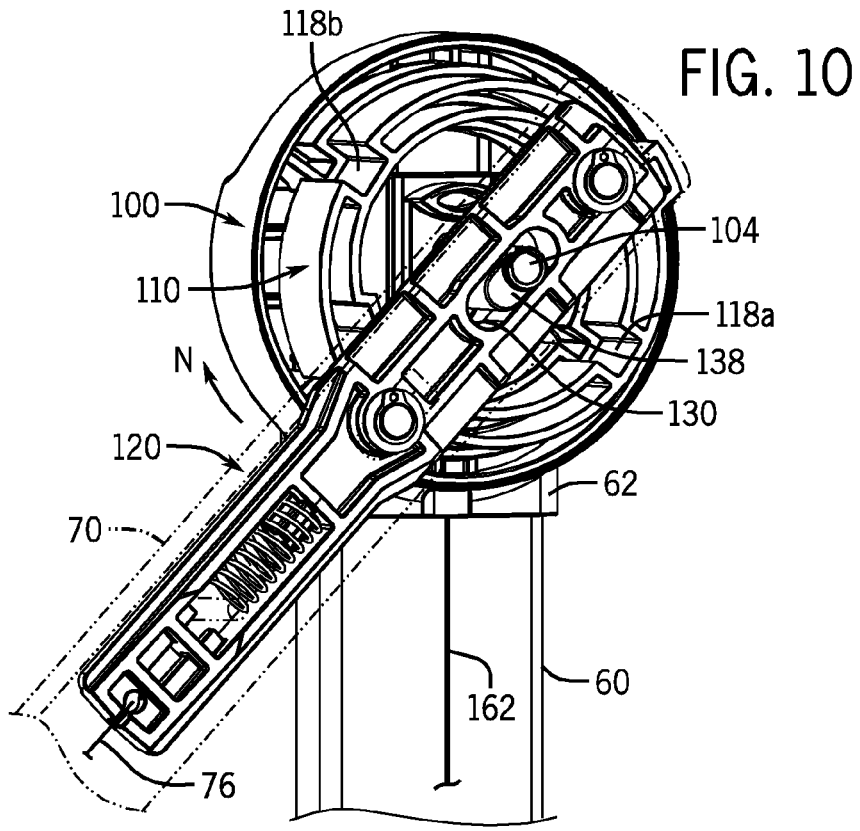
FIG. 10 shows an outside view of the left side handle pivot joint in FIG. 9 with the joint cover and handle cover removed.
Figure 11:
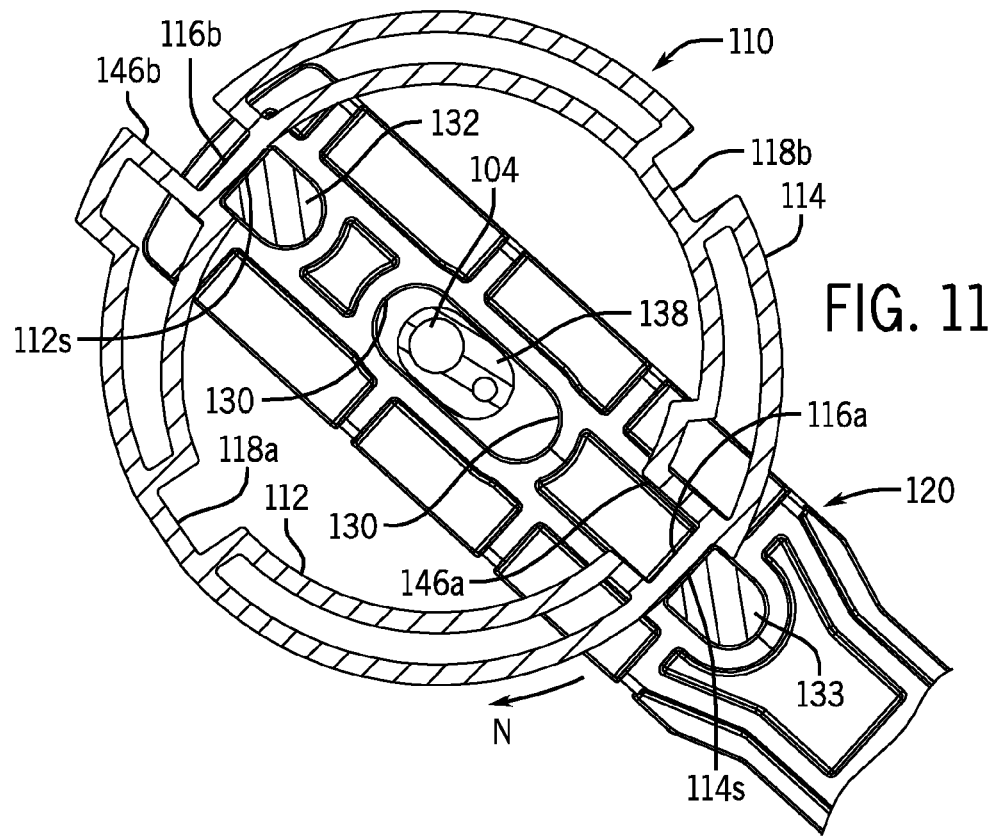
FIG. 11 shows a reverse or inside view of parts of the left side handle pivot joint in FIG. 10.

However, the handle 54 can be moved to a third position in this example. By rotating the handle further downward in the direction of the arrow S from the reverse position in FIG. 6 toward the front wheels 86, the handle can be moved to a folded or stowed position as shown in FIG. 9. Again, as the handle is rotated from the reverse position to the stowed position, the studs 132, 133 can ride along respective inner and outer surfaces 112, 114 of the positioning ring 110 until each stud reaches a corresponding step 150a, 150b on the respective ring surface. As the studs 132, 133 pass the steps 150a, 150b, the studs drop via the shuttle spring force to lower elevation sections 112s and 114s of the surfaces 112, 114, respectively. Further downward movement of the handle 54 is prevented by the structure of the frame assembly 50, and particularly the front wheel section 64, which thus defines the lower most stowed position of the handle in this example. FIGS. 10 and 11 show the pivot joint 56 with the push bar 70 of the handle 54 in the stowed position. FIGS. 3A and 11 best illustrate the steps 150a, 150b. In this example, the handle 54 is prevented from returning to the reverse handle position by the studs contacting the steps. The handle 54 can be freely moved from the stowed position back toward the reverse handle position simply by again actuating the actuator 74. Alternatively, it is within the spirit and scope of the present invention to construct, if desired, the pivot joints and handle latch mechanism to provide a positive downward motion stop for the handle and/or to eliminate the steps 150a, 150b. Without the steps, the handle would be capable of moving freely upward from the stowed position without having to actuate the actuator 74.

Figure 13:
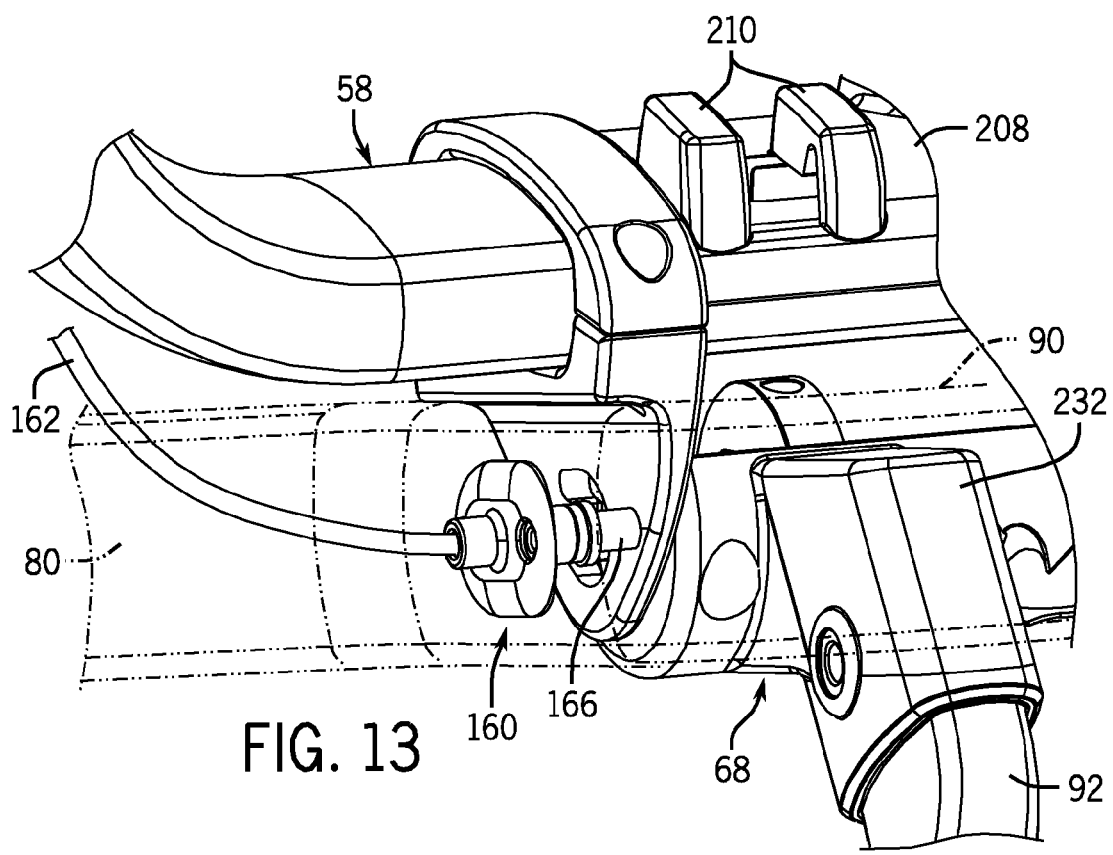
FIG. 13 shows a close-up, partly phantom view of the parts of the storage latch in FIG. 12.
Figure 12:
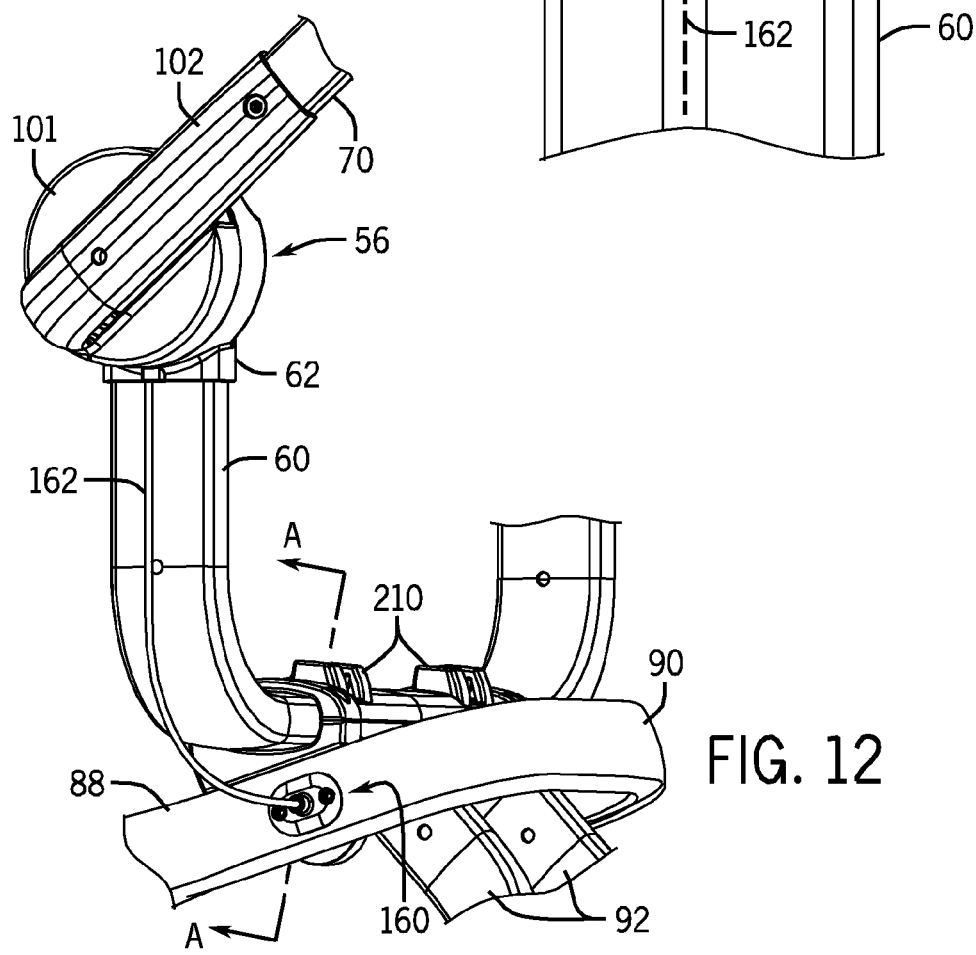
FIG. 12 shows an alternate and fragmentary perspective view of a portion of the stroller frame assembly in FIG. 1 including parts of the storage latch.
Figure 14:
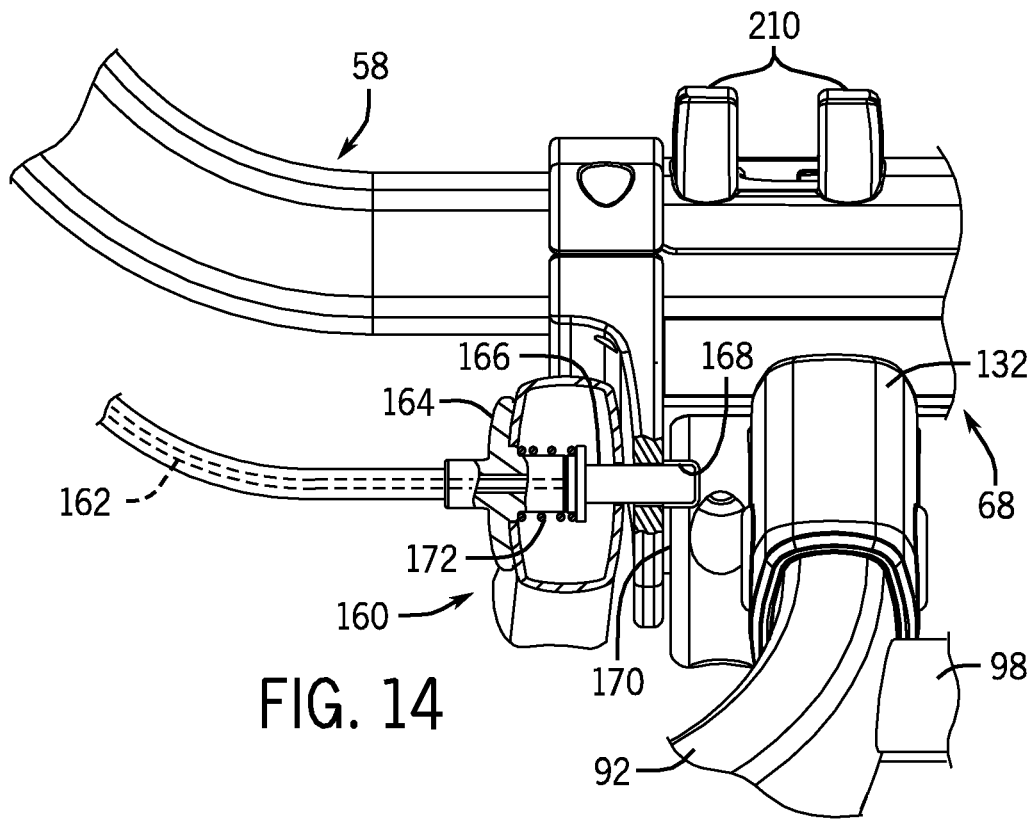
FIG. 14 shows a rear fragmentary cross-section taken along line A-A in FIG. 12 of the storage latch pin in a retracted position corresponding to the stroller handle position in FIGS. 1 and 5.

FIG. 12 shows a rear perspective view of a portion of the frame assembly 50 including the left side pivot joint 56, the seat mount 58, the upper ends of the rear legs 92, and the upper ends of the front legs 80 including the crossbar 90. A storage latch 160 and an actuation cable 162 are also shown. FIG. 13 shows a close-up of another perspective view of this portion of the frame assembly 50 including the storage latch 160, whereby the pertinent portions of the front leg 80 and crossbar 90 are shown in phantom to reveal the storage latch. The storage latch 160 generally includes a coupling 164 to which one end of the actuation cable 162 is connected. The coupling is mounted or connected to an outside surface of the front leg 80. The storage latch 160 further includes a first latch part, such as a storage latch pin 166 projecting inward into and through the front leg 80. The latch pin 166 is spring biased to extend inward beyond the interior surface of the front leg 80. However, the other end of the actuation cable 162 is coupled to a portion of the pivot joint 56 to control the position of the storage latch pin 166. As shown in FIG. 14, a second latch part, such as a storage pin receptacle 168 is formed into a surface 170 of the chassis joint 68 that in this example is configured to move or pivot with the rear legs 92. The storage pin 166 is shown in a retracted or unlatched condition. In other words, the pin is withdrawn from the pin receptacle 168 and into the front leg 80 against the bias of a spring 172 to a retracted, unlatched condition.

With reference to FIGS. 3A and 4A, a cam follower or slider 174 is captured in a track formed between two linear, vertical rails 176 on a surface of the housing 100 within the pivot joint 56. A cam projection 178 projects from an upper end of the slider 174 and bears against and rides along the circumferential surface of the cam disc 140. With the handle 54 in the normal use position of FIG. 1, the circular segment 142 of the cam disc 140 is beneath and borne against the cam projection 178. In this configuration, the slider 174 is pushed upward to a raised or release position.

Figure 15A:
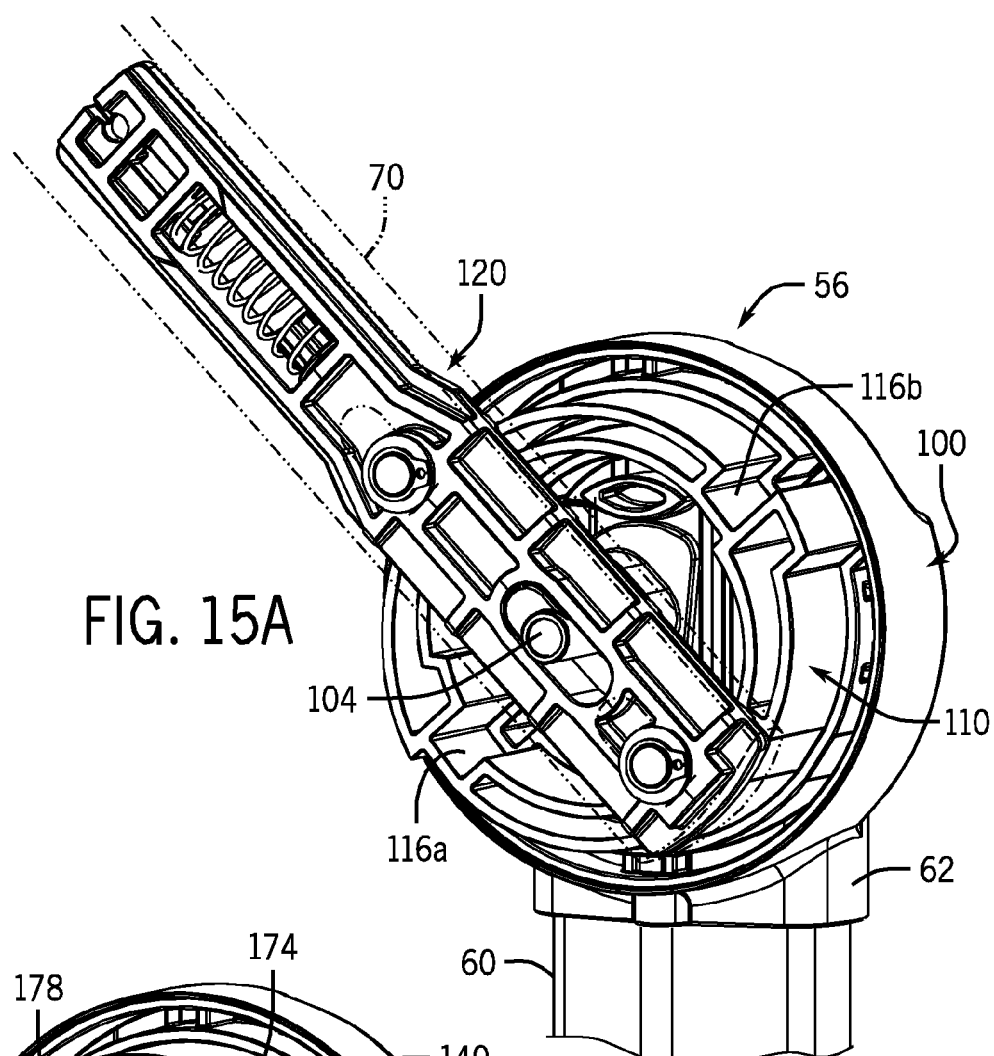
FIG. 15A shows a close-up and alternate perspective view of the handle pivot joint in FIG. 6A.
Figure 15B:
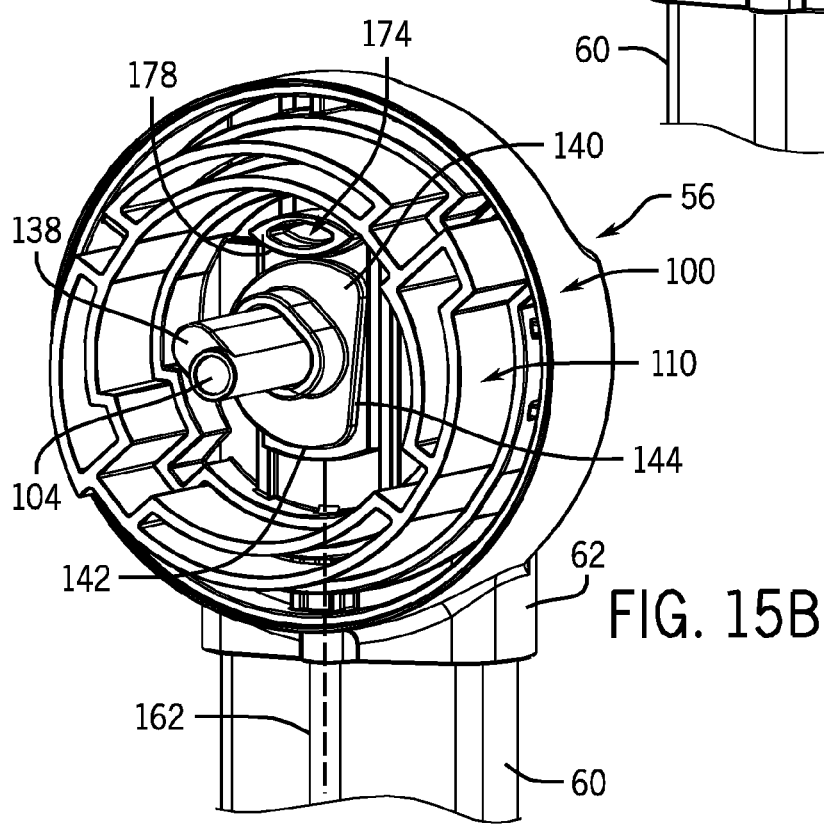
FIG. 15B shows the left side handle pivot joint in FIG. 15A, but with the handle removed.

A lower end of the slider 174 is connected to the other end of the actuation cable 162. As a result, the circular segment 142 holds the cam projection 178, and thus the slider 174, in the raised or release position, which in turn pulls upward on the actuation cable 162. The cable 162 thus withdraws or retracts the storage pin 166 against the bias of the spring 172 into the front leg 80. In this component configuration, the storage latch 160 is disengaged or unlatched. As shown in FIGS. 15A and 15B, as well as in FIG. 6A, the storage cam 134 rotates as the push bar 70 and shuttle 120 are moved about the pivot axis H from the normal use position to the reverse position in FIG. 6. The circular segment 142 of the disc 140 still underlies the cam projection 178 in this handle position. As a result, the storage latch 160 is still held in the unlatched condition of FIG. 14. The handle 54 can be moved between the normal use position and the reverse position without affecting the unlatched or retracted position of the storage latch pin 166 in this example.

Figure 18:
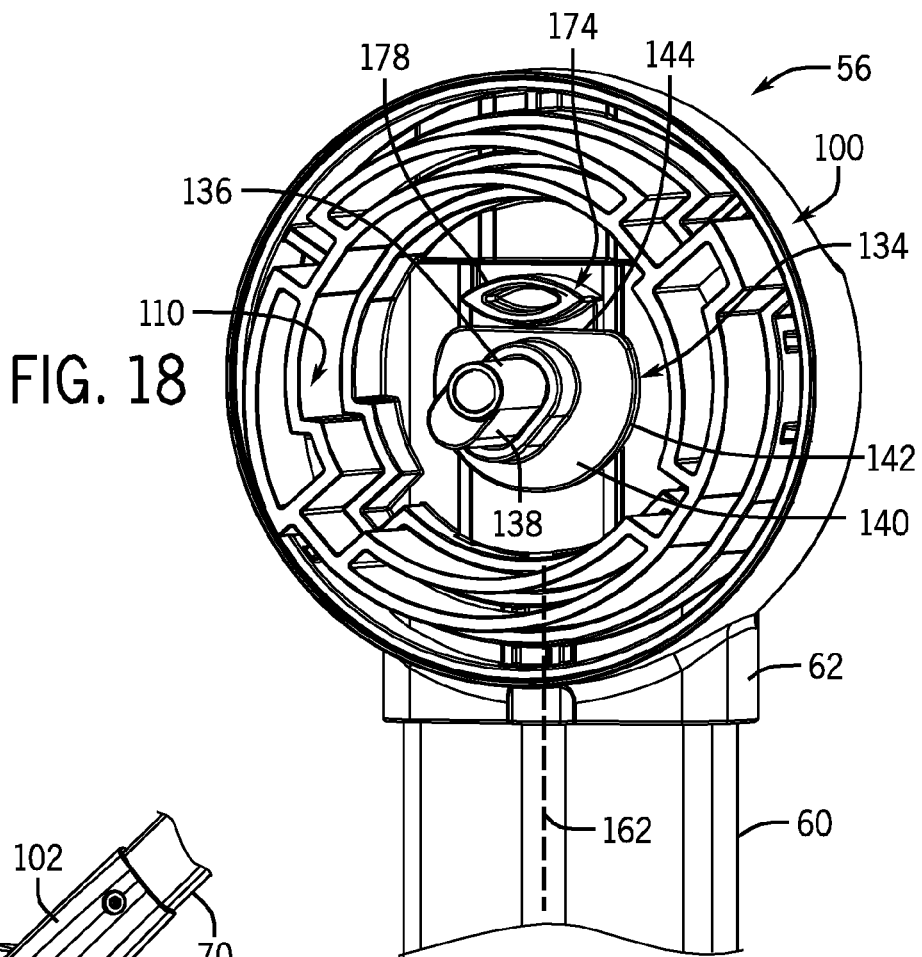
FIG. 18 shows the left side handle pivot joint in FIG. 10, but with the handle removed.
Figure 16:
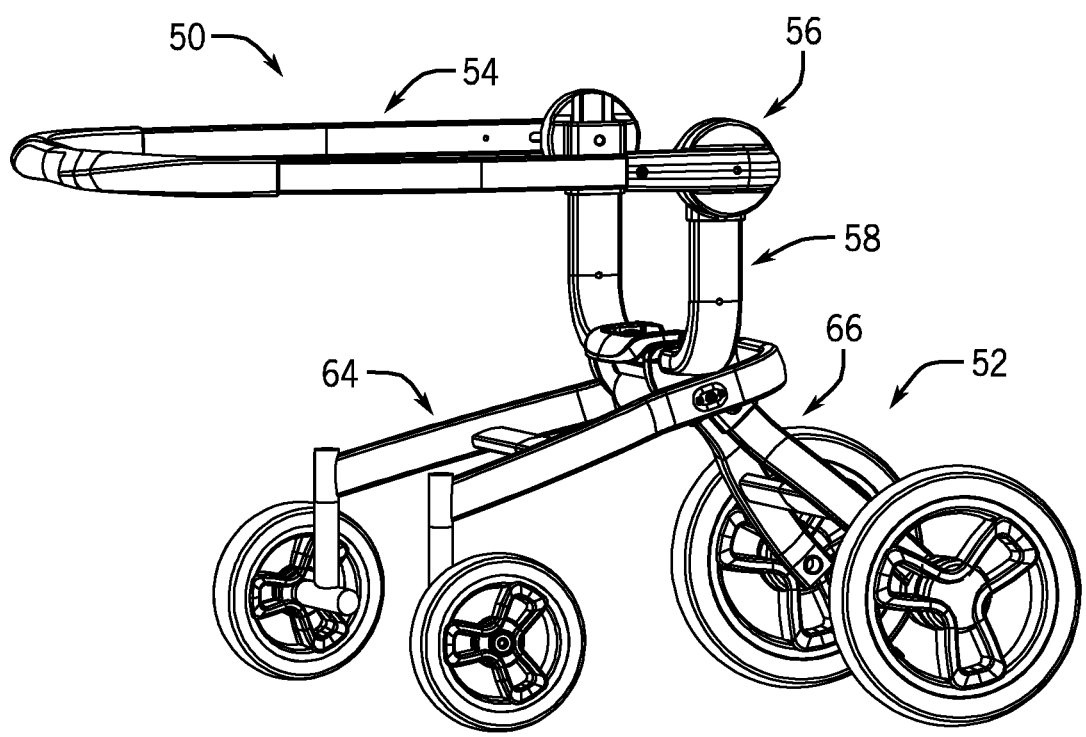
FIG. 16 shows the stroller frame assembly in FIGS. 1, 6, and 9, but with the handle positioned between the reverse use position and the stowed or lowered position.
Figure 17A:
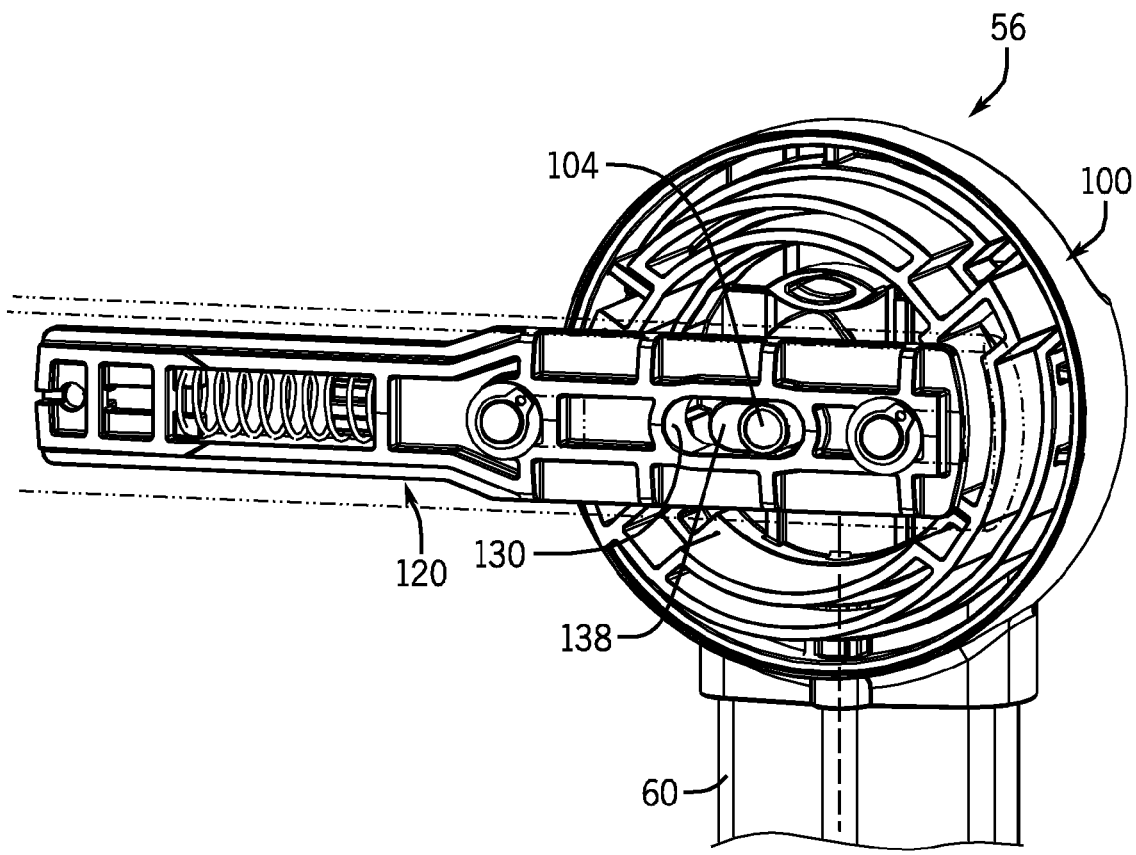
FIG. 17A shows the left side handle pivot joint in FIG. 15A, but with the handle positioned as in FIG. 16.
Figure 17B:
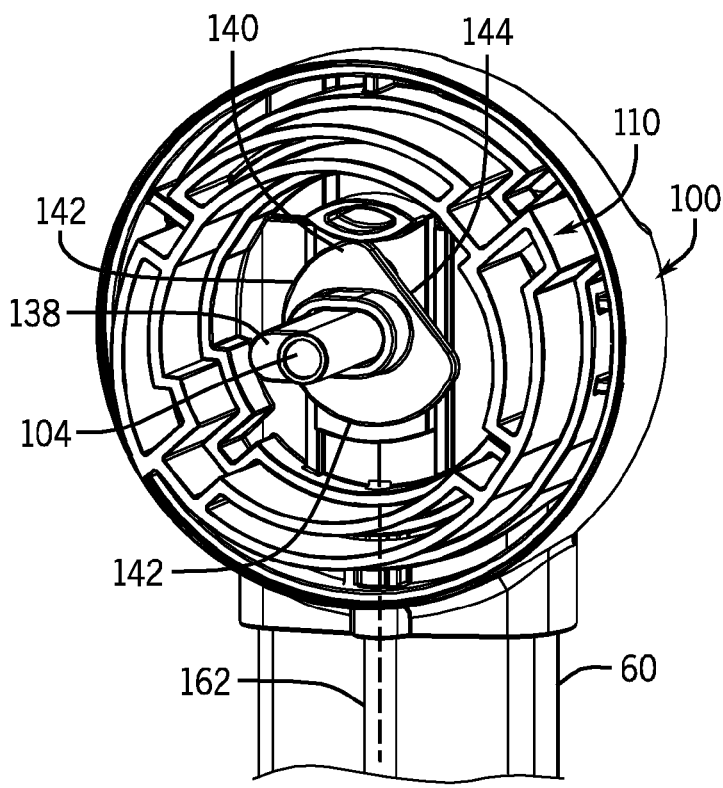
FIG. 17B shows the left side handle pivot joint in FIG. 17A, but with the handle removed.
Figure 19A:
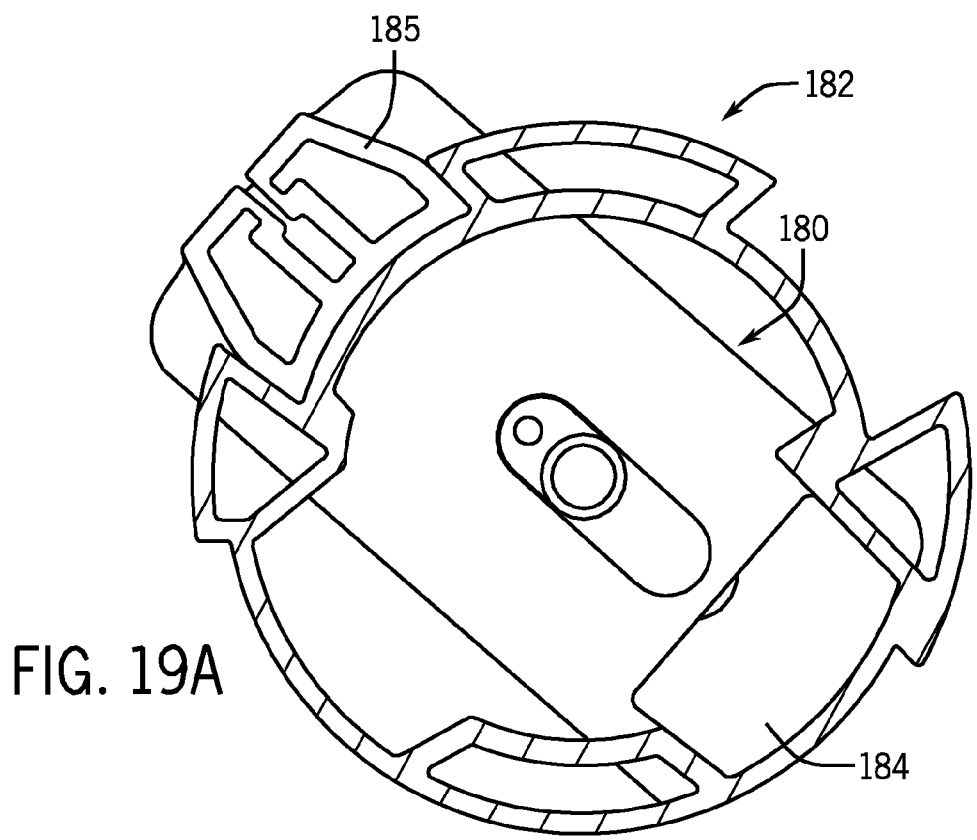
FIGS. 19A and 19B show an alternative example of a handle shuttle and latch ring for a reversible handle in a normal use position depicted in FIG. 1 and in a latched and an unlatched position, respectively.
Figure 19B:
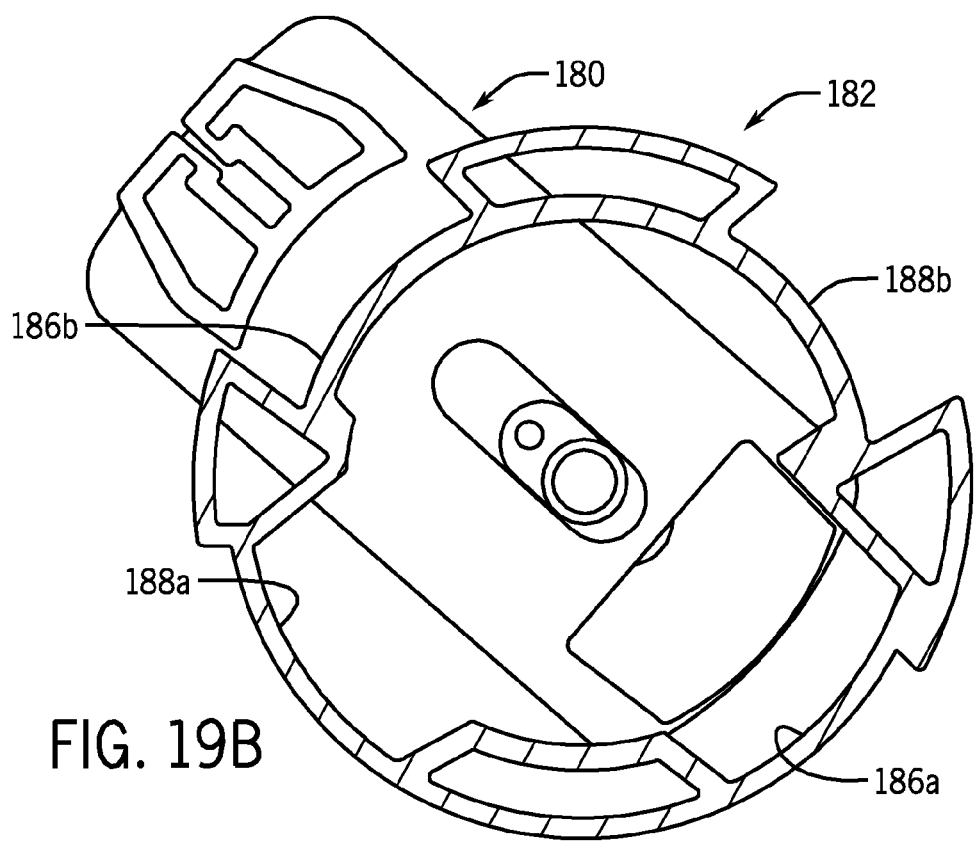
Figure 20:
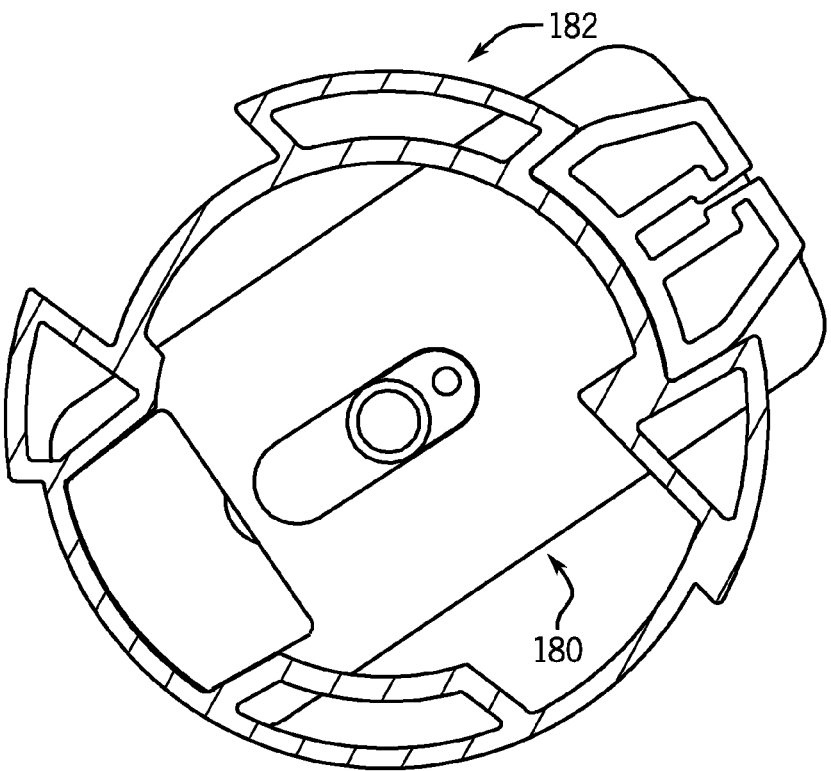
FIG. 20 shows the handle shuttle and latch ring in FIGS. 19A and 19B, but for a handle in a reverse use position.
Figure 21:
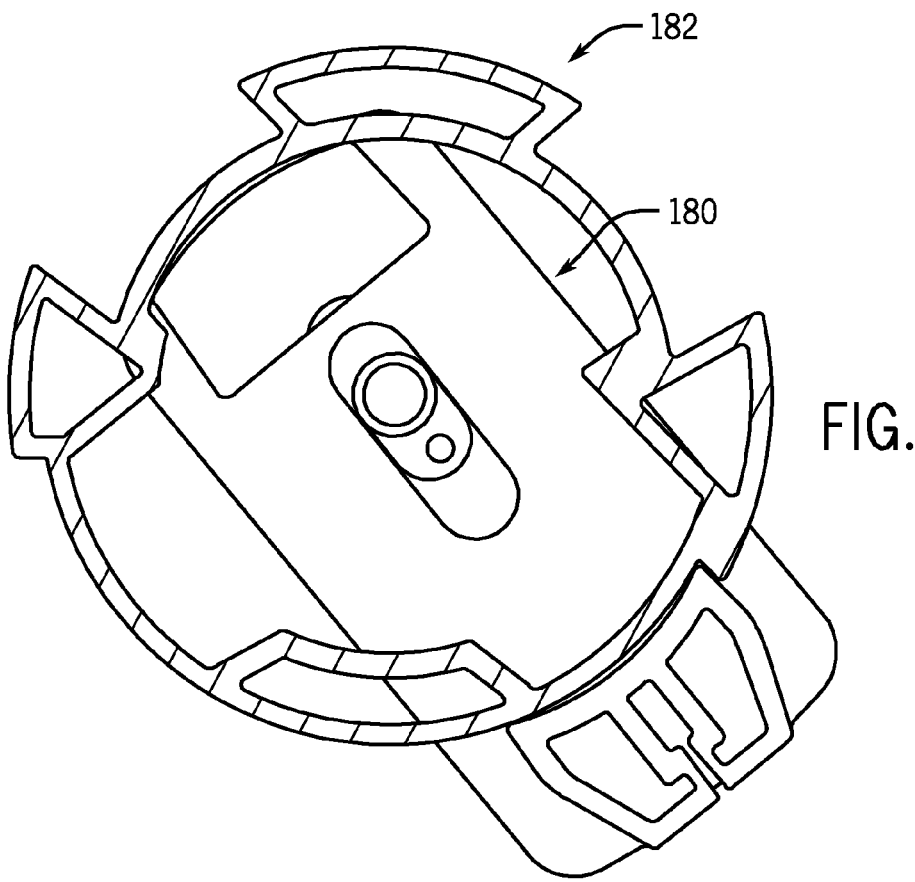
FIG. 21 shows a handle shuttle and latch ring in FIG. 20, but for a handle in a lowered or stowed position.

FIG. 16 shows an intermediate position of the handle 54 between the reverse position of FIG. 6 and the lowered or stowed position of FIG. 9. FIGS. 17A and 17B show the condition of the left side pivot joint 56 with the handle 54 in this intermediate position. As shown, the storage cam 134 is positioned so that the cam projection 178 on the slider 174 is about to transition from the circular segment 142 of the cam disc 140 to the flat segment 144. As the push bar 70 is rotated further toward and then fully downward to the stowed position of FIG. 9, the storage cam 134 also rotates so that the flat segment 144 of the disc 140 is positioned directly under the cam projection 178. The pivot joint is shown in FIGS. 10 and 18 in the stowed handle position. The center of the flat segment 144 is positioned significantly closer to the pivot axis H than the circular segment 142, which allows the slider 174 to drop downward to a latched position depicted in FIG. 18. This allows the spring 172 of the storage latch 162 extend or push the latch pin 166 inward from the front leg 80. However, if the front wheel section 64 and the rear wheel section 66 are still in the in-use or set-up configuration relative to one another as in FIGS. 1, 6, and 9, the receptacle 168 will not yet be aligned with the latch pin 166. A pin 166 will instead fire against the surface 170 of the chassis joint 68 and will be prevented or blocked from latching. Engagement of the storage latch 160 and folding of the remainder of the frame assembly 50 is described in greater detail below.

As will be evident to those having ordinary skill in the art, the storage latch mechanism can vary from the configuration and construction of the components disclosed and described herein. In this example, the storage latch mechanism includes the cam follower or slider 174, the storage cam 134, the actuation cable 162, and the storage latch 160, which is inclusive of the coupling or connector 164, the spring 172, the latch pin 166, and the pin receptacle 168. The various devices and components which interconnect the movement of the handle 54 with movement or actuation of the storage latch 160 can vary and yet function as intended. The interaction, shape, orientation, relative movement, direction of movement, location, and the like of the various storage latch mechanism components can also vary within the spirit and scope of the present invention. Many strollers utilize only one storage latch on one side of the stroller frame. Though one storage latch 160 is employed in this example, it is possible to include a storage latch 160 on each side of the frame assembly, if desired. This can reduce undue stress on the frame assembly and various joints if lifted from one side when folded. The handle 54 also may only be movable between only a normal use position and a stowed position, without any reverse position and yet function as intended.

Also, the configuration and construction of the pivot joint 56, including the handle latch functionality, and its various components can also vary from the example disclosed and described herein. To illustrate, FIGS. 19A, 19B, 20, and 21 show an alternative example of a handle shuttle 180 and positioning ring 182. The shuttle 180 is substantially similar to the earlier described shuttle 120, except in that the keys and ways are replaced by much larger, wider components. In this example the shuttle 180 has a pair of lengthwise spaced apart latch projections 184, 185. The latch projection 184 again seats in one of an inner surface way or notch 186a or 188a and the projection 185 seats in an outer surface way or notch 186b or 188b, depending on the position of the handle and, thus, the shuttle 180. The notches in the ring 182 are similar to the earlier described notches in the ring 110, except in size to accommodate the alternate projections. As will be evident to those having ordinary skill in the art, numerous other changes and modifications to the various storage latch and pivot joint components can be made without departing from the spirit and scope of the present invention.

The materials used to fabricate the various frame and latch mechanism components can vary and the invention is not intended to be limited to any specific materials. The compact, light weight reversing handle latch and storage latch mechanisms disclosed and described herein provide a strong, durable, dual shear point actuator (shuttle has two keys or contact elements). The structure can resist large mechanical advantage inputs that will occur during normal pushing of the stroller frame assembly 50 via the handle 54. The disclosed mechanisms can incorporate the sliding shuttle to engage an aluminum positioning ring. Each handle position latch in the disclosed example employs two contact points via the two keys and ways or notches at each handle position. However, it is also possible to employ only a single contact point or more than two contact points at any one or all of the handle positions, if desired. In this example, each pair of contact points (keys and notches) for each handle position is positioned 180° opposite one another on the handle pivot joints 56. These contact point pairs can alternatively be offset radially from one another at more or less than 180°, as desired.

Figure 22:
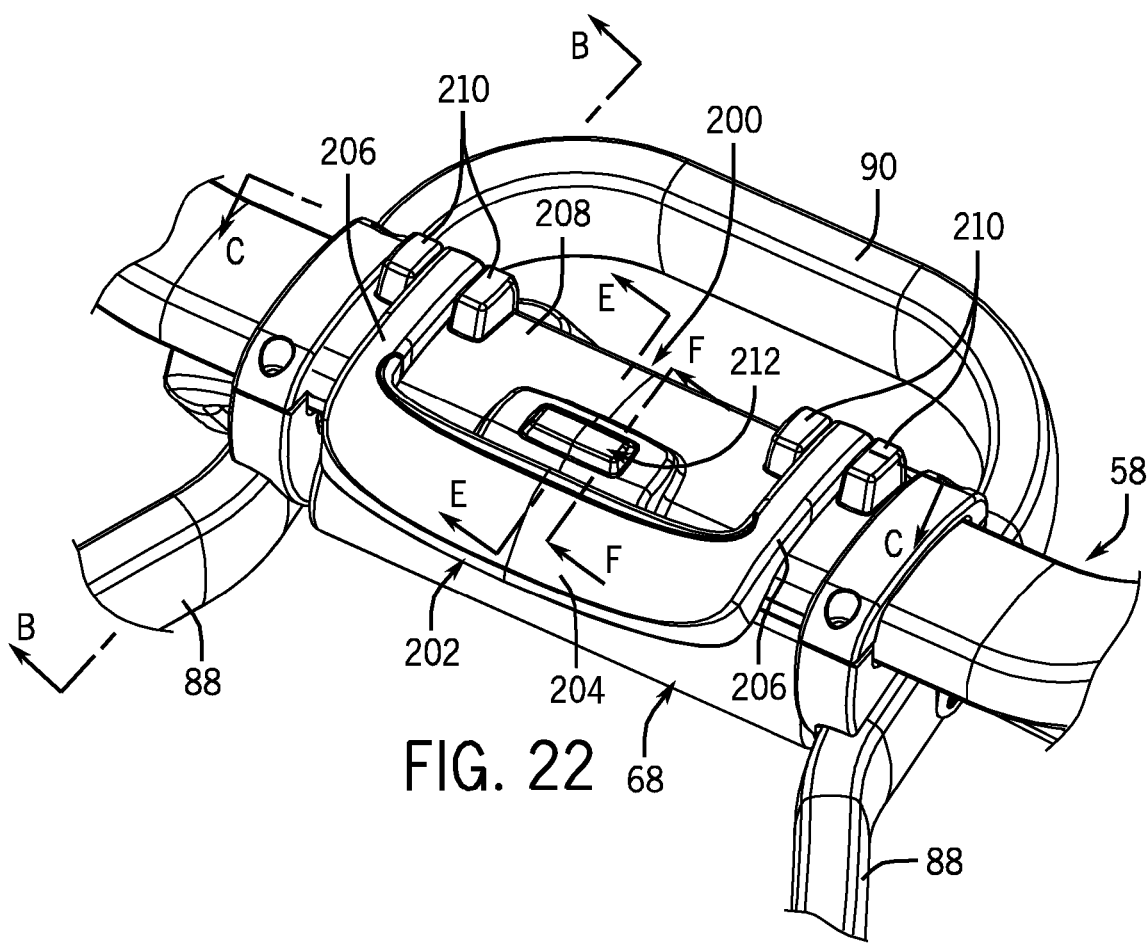
FIG. 22 shows a close top perspective view of a fold latch assembly for a stroller constructed in accordance with the teachings of the present invention and in a latched position.

The disclosed stroller frame assembly 50 also has a fold latch mechanism 200 as generally depicted in FIG. 22. The fold latch mechanism 200 in this example is positioned centrally between the left and right frame sides on the chassis joint 68 as depicted in FIG. 1. The mechanism would be positioned under the stroller seat (not shown), which in this example is removable and can be removed when the frame assembly is folded. The disclosed fold latch mechanism 200 has a C-shaped release handle 202 that lies horizontally between the frame sides. The release handle has a grip section 204 and a pair of hinge legs 206 that extend rearward from opposite ends of the grip section. Free ends of the hinge legs 206 are pivotally joined to a mechanism cover and/or housing 208 at hinge connectors 210 that project up from the cover. The fold latch mechanism 200 also generally has a safety catch 212 that projects up from the cover 208 adjacent the release handle 202 between the legs 206.

Figure 23:
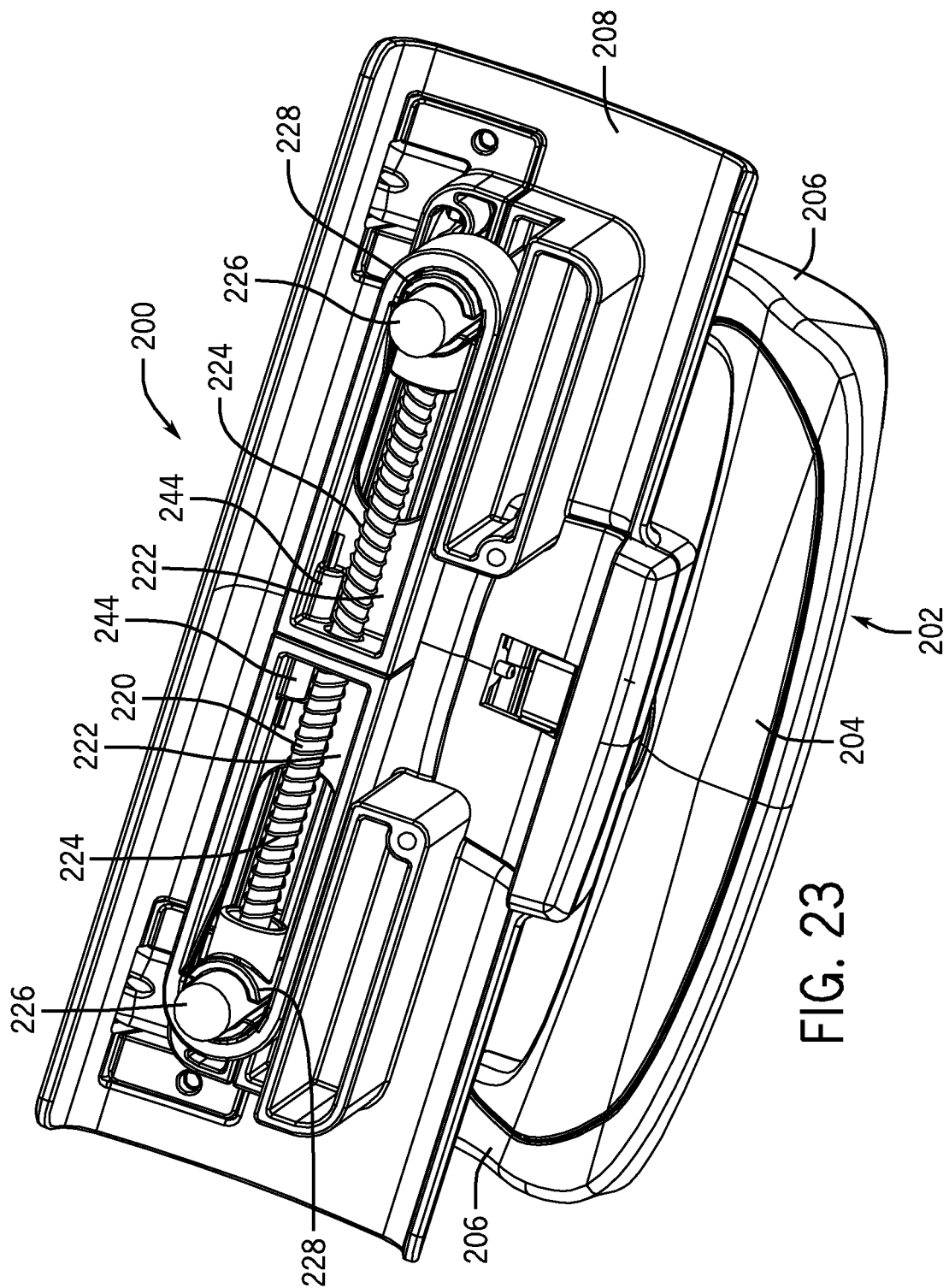
FIG. 23 shows a bottom view of the fold latch assembly in FIG. 22 with a bottom cover removed exposing inner workings of the assembly.

FIG. 23 shows a bottom view of the fold latch mechanism 200 with the surrounding stroller components removed to expose the internal guts of the mechanism. The fold latch mechanism 200 has a guide shaft 220 that extends laterally across the mechanism generally parallel with the grip section 204 of the release handle 202. A pair of actuator shuttles 222 is slidably carried on the guide shaft 220. The single shaft passes through openings 223 in the end walls of each shuttle. A pair of springs 224 is received over the guide shaft 220, one within each of the actuator shuttles 222. The springs 224 bias the actuator shuttles 222 toward and into abutting contact with one another to a latched position as shown. A first fold latch part, such as a fold latch pin 226 is respectively associated with each of the actuator shuttles. Each of the fold latch pins 226 is slidably housed within a discrete pin guide 228 affixed to the cover or housing 208. Each of the pins 226 can vertically slide within its respective pin guide 228 but is otherwise stationary in this example. The pin guides 228 are affixed to the ends of the shaft 222. Each of the actuator shuttles 222 slides in a horizontal and lateral or transverse direction relative to the stroller frame assembly 50 and perpendicular to the motion of the fold latch pins 226.

Figure 24:
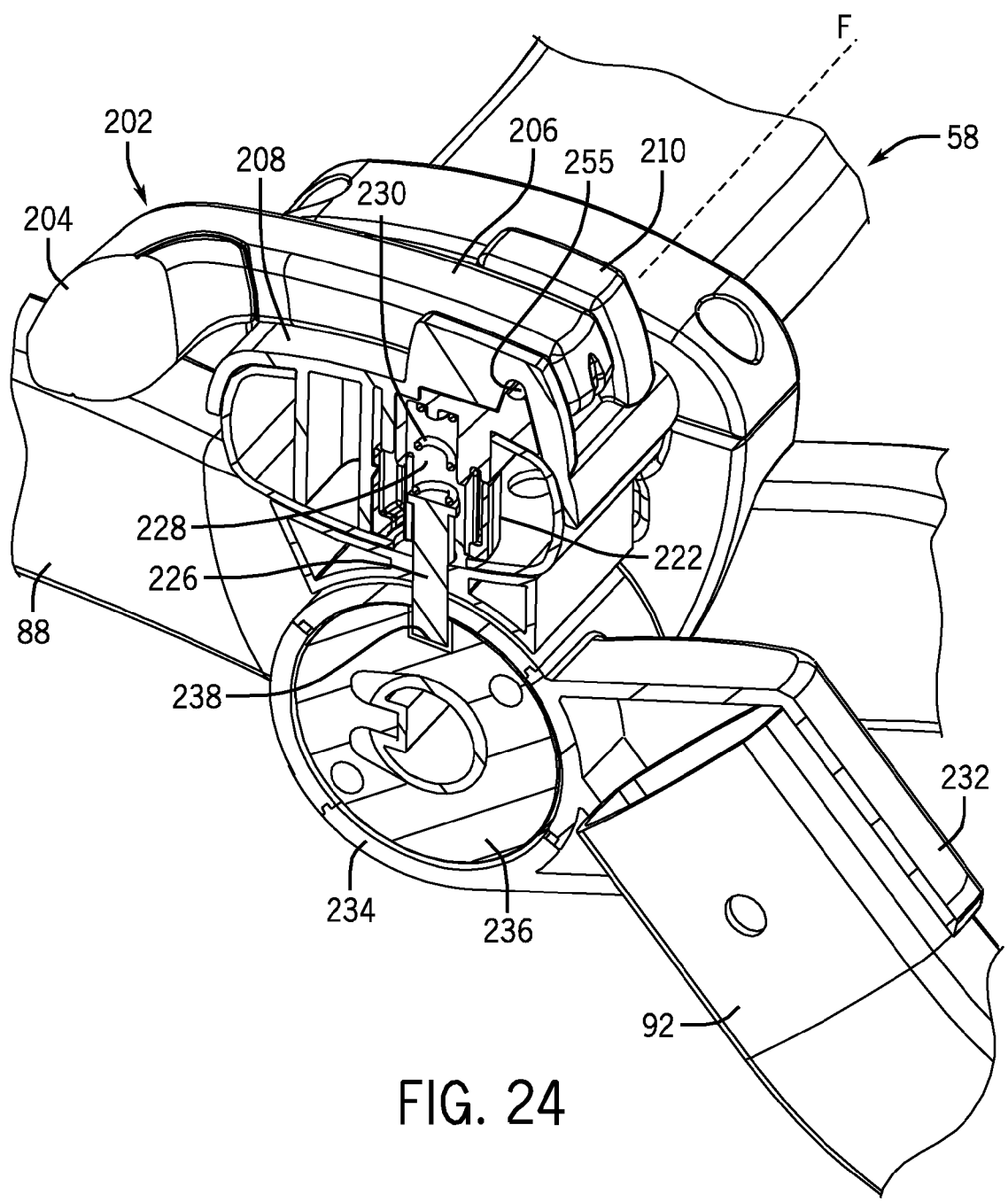
FIG. 24 shows a cross-section of the fold latch assembly and a portion of the chassis taken along line B-B in FIG. 22.

FIG. 24 shows a vertical cross-section through the fold latch mechanism 200 along the right side latch pin 226. The opposite left side of the mechanism 200 is essentially identical in this example. The fold latch pin 226 is biased downward to a latched position by a latch spring 230 that is housed within the respective pin guide 228. The rear leg 92 has a top cap 232 that forms a hub 234, which is pivotally received over a horizontal and transverse center axle 236 of the frame assembly 50. The center axle 236 in this example is fixedly connected to the front wheel section 64 and forms a part of the chassis joint 68, along with the hubs 234, and the hubs can pivot about the center axle. In this example, a second fold latch part, such as a pin receiver 238 opens upward and is formed through each of the rear leg hubs 234 and downward into the center axle 236. Each latch pin 226 is extended through the opening in the respective hub 234 and into the corresponding pin receiver 238 in the center axle 236 when the fold latch is engaged or a latched as shown.

Figure 25:
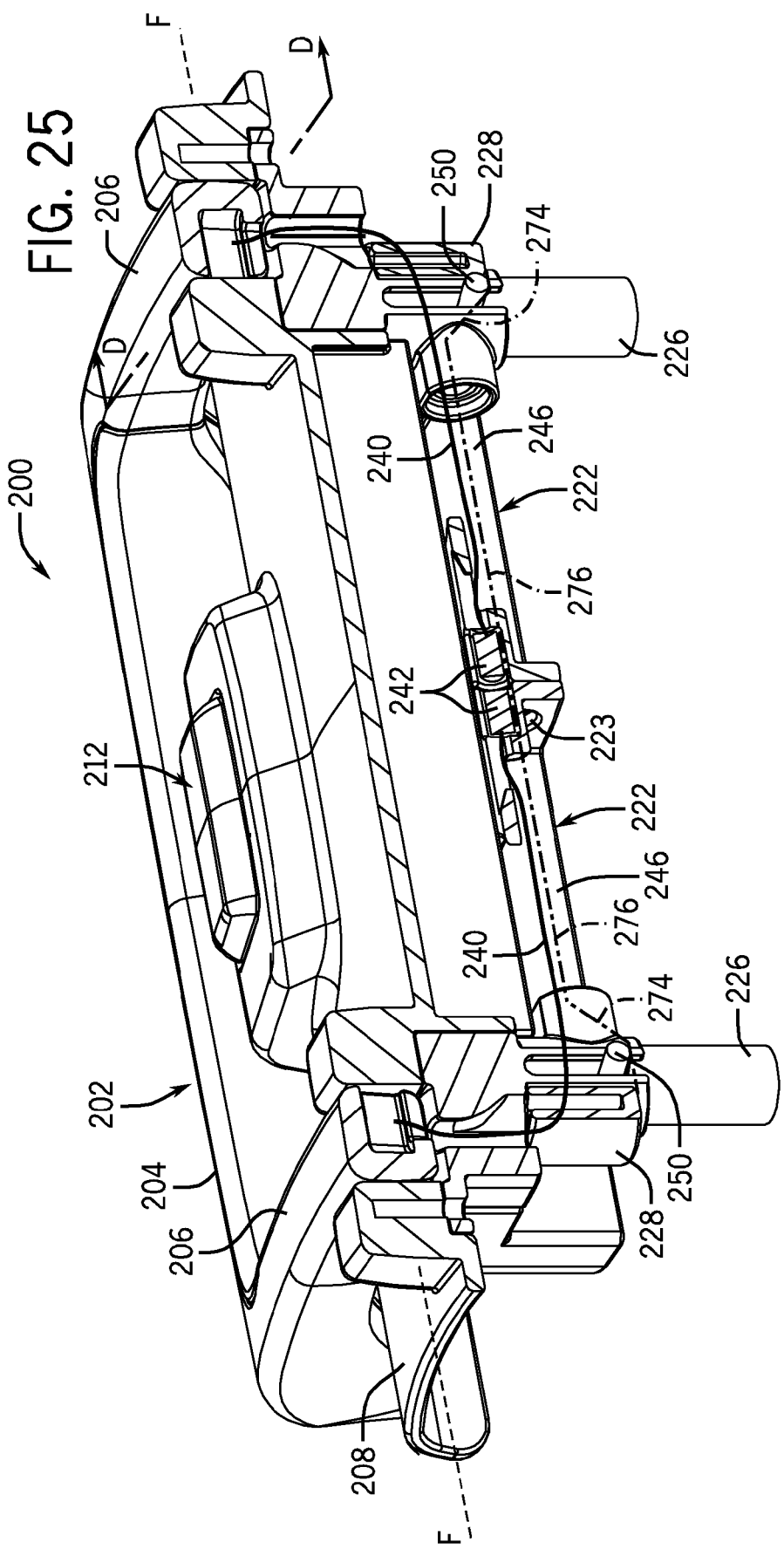
FIG. 25 shows a cross-section of the fold latch assembly taken along line C-C in FIG. 22.

FIG. 25 shows a lateral cross-section through the mechanism 200 removing one wall along an edge of each of the shuttles 222. A release cable 240 is coupled to each of the shuttles 222 and has one end with a slug 242 captured in a cable retainer 244 on the inside of a shuttle wall 246. The retainers 244 are positioned at the inner end of each of the shuttles 222 and thus each release cable 240 is routed lengthwise along each of the shuttles 222 from the abutting or adjacent ends to the opposite outer ends. The guide shaft 220 and springs 224 are removed in this figure. An actuator track or ledge 248 is formed on an interior surface of the wall 246 on each of the shuttles 222. The tracks or ledges 248 are schematically represented in FIG. 25 and are formed on the same wall as the cable retainer 244 (see FIG. 24). Each of the fold latch pins 226 has one or more gudgeons 250 projecting radially outward from the pin circumferential surface. Each of the gudgeons 250 is slidable within a slot 252 extending vertically along the respective pin guide 228. In addition, each of the gudgeons 250 bears against the actuator track or ledge 248 on the corresponding shuttle wall 248. As depicted in FIG. 24, each of the opposed walls 246 of each shuttle 222 can include an identical track or ledge 246 and each of the pins 226 can include a pair of oppositely extending gudgeons 250, one riding along each track or ledge 248 within each shuttle 222.

As shown in FIG. 26, the opposite end of each release cable 240 as another slug 252 captured in an opening 253 in a respective one of the handle hinge legs 206. The underside of each leg 206 has a curved cable guide 254 positioned near the pivoting end of the leg. Movement of the release handle 202 will pull on the release cables 240 as described in greater detail below. As shown in this figure, the release handle 202 can pivot about hinges pins 255 that define a handle pivot axis F and that are supported by the hinge connectors 210 and coupled to the hinge legs 206.

As a safety precaution, the safety catch 212 retains the release handle 202 in a downward latched position against the cover or housing 208 as shown in FIGS. 22 and 26. FIG. 27 shows a cross-section through the fold latch mechanism 200 and the safety catch 212. As shown, a catch recess 260 is formed into a rear facing surface of the grip section 204 on the release handle 202. The safety catch 212 has an actuator or button 262 positioned over a catch finger 264. One end of the catch finger 264 is seated in the recess 260 to retain the release handle 202 in the latched position against the cover 208. A safety spring 266 biases the catch finger 264 into the recess 260. As shown in FIG. 28A, the button 262 pivots at one end about a pair of button pivots 268 that extend in opposite directions from one another on either side of the button. A pair of actuator prongs 270 curves forward and downward from the other end of the button 262, one each on either side of the catch finger 264. The actuator prongs 270 bear against corresponding lateral projections 272, which extend from either side of the catch finger 264. Pushing the button 262 downward, as depicted in FIG. 28B, causes the actuator prongs 272 to push the finger projections 272 rearward against the bias of the spring 266. This withdraws the catch finger 264 from the recess 260 and frees the release handle 202 for upward rotation about the hinge pins 255 as shown in FIG. 29.

FIGS. 30 and 31 show the release handle 202 in an intermediate position rotated upward 90° from the latched position relative to the cover 208. As the release handle 202 rotates upward, the release cables 240 are guided around the curved guides 254 and pull the shuttles 222 outward and away from one another. This causes the pin gudgeons 250 to ride up a ramped portion 274 on each of the ledges or tracks 248 of the shuttle walls 246. The ramps push the fold latch pins 226 upward within the respective pin guides 228, withdrawing the pins from the receivers 238 in the center axle 236. With the handle 202 in the intermediate release position, the fold latch mechanism is fully disengaged in this example. Thus, a user can raise and lift the stroller frame up by the handle, which can cause the chassis to begin to fold, i.e., the rear wheel section 66 can begin to pivot toward the front and rear wheel section 64. The user can lift can carry the stroller frame assembly 50 using the release handle 202.

As shown in FIGS. 32 and 33, the release handle 202 is designed to over travel and can be further rotated to a fully rotated position 180° from the latched position relative to the housing or cover 208. This pulls the shuttles further outward and away from one another. In doing so, the pin gudgeons 250 are free to ride along a horizontal section 276 of the tracks 248 remote from the ramped sections 274. Allowing the gudgeons 250 to ride along the flat sections 276 of the tracks 248 permits the handle to freely rotate well beyond the 90° position all the way to the 180° position. This over travel condition or free travel of the handle assists in preventing stress on the cables 240 as well and the release handle pivot connectors 210 and pivots 255. The free travel renders the release handle functionally like a suitcase handle, all the while performing the latch release function as well. Once the chassis 52 is sufficiently folded, the released handle 202 can be let go. The shuttle springs 224 will bias the shuttles 222 toward one another, which will return the release handle 202 to the latched position against the housing or cover 208. As shown in FIG. 29, the release handle, just below the recess 260, has a lead-in or ramp surface 280 that acts to push the catch finger 264 clear of the release handle 202, allowing the handle to return to the latched position where the finger will fire into the recess. The fold latch pins 266 will bear against surfaces of the hubs 234 or the center axle 236 in a latch ready position, but will be unable to fire into the latch receivers 238 because they are out of alignment with the pins.

Figure 35:
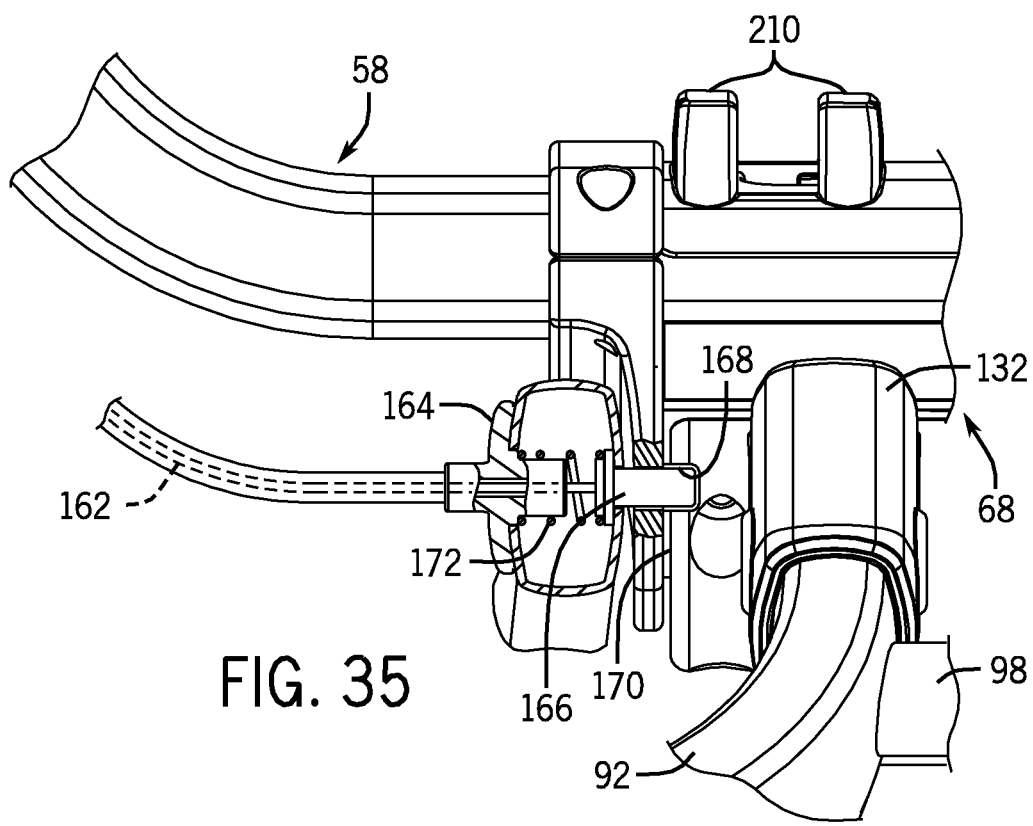
FIG. 35 shows the cross-section of the storage latch pin in FIG. 14, but with the storage latch in a latched position corresponding to the stroller handle position in FIG. 9 and the chassis position in FIG. 34.
Figure 34:
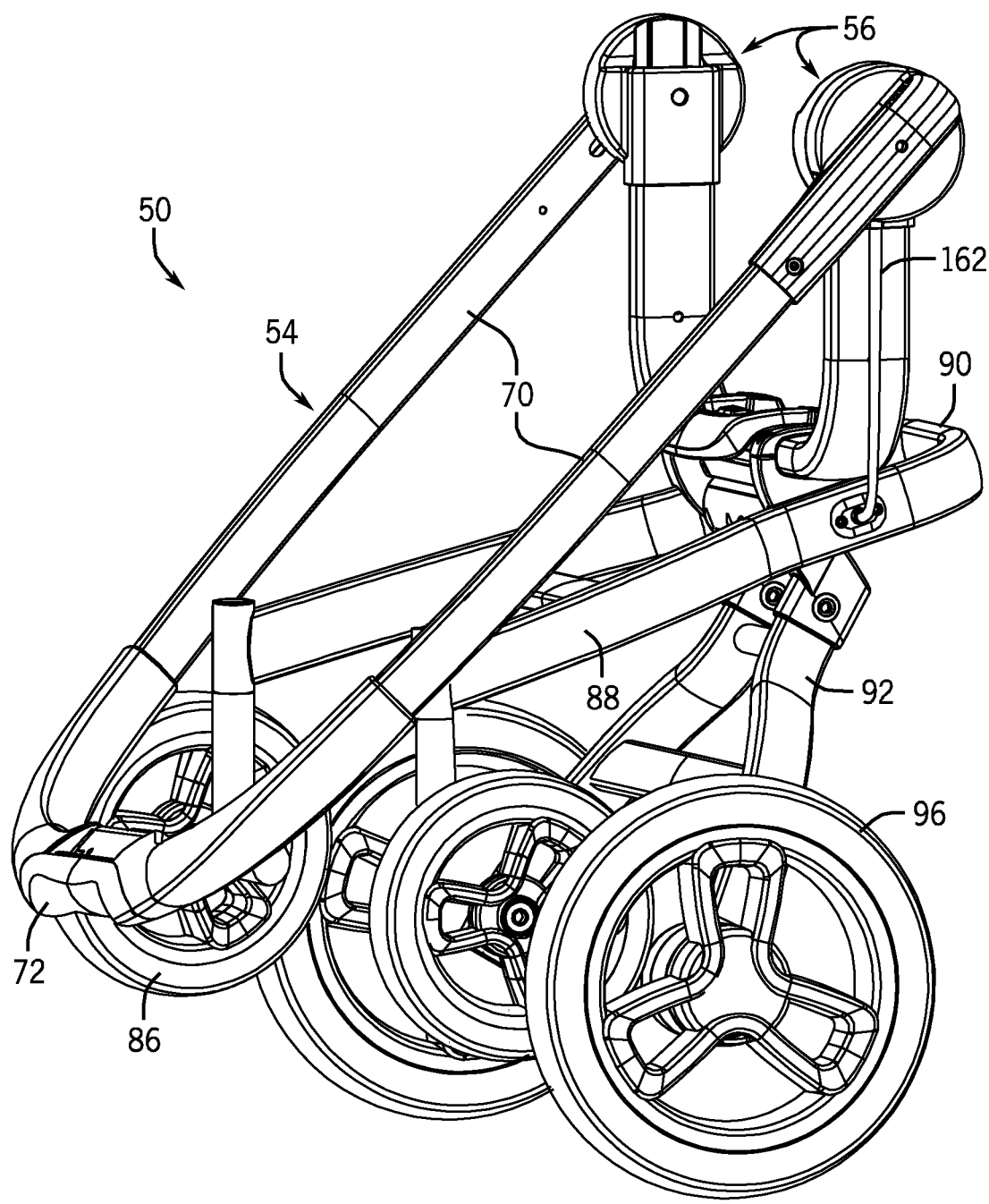
FIG. 34 shows the stroller frame assembly in FIG. 1, but in a completely folded configuration.

As shown in FIG. 34, the rear wheel section 66 of the chassis 52 can be pivoted about the center axle 236 and hubs 234 toward the front wheel section 64. The handle 54 is shown in the stowed position of FIG. 9, which actuates the storage latch mechanism to the latched condition described above. Once the two wheel sections 64, 66 of the chassis 52 reach a predetermined folded orientation, the storage latch pins 166 will align with the corresponding storage receptacles 168. The storage latch pins 166 will fire into the receptacles 168 as shown in FIG. 35 via the force of springs 172. In this configuration, the chassis 52 and the handle 54 are completely folded to the folded configuration. The pins 166 of the storage latch mechanism will retain the chassis 52 in the folded configuration as long as the handle 54 remains in the stowed position. In order to unfold the stroller frame assembly 50, the handle 54 can be pivoted upward from the stowed position toward the reverse handle position of FIG. 6. This in turn will rotate the storage cams 134 and sliders 174 in the pivot joints 56 and withdraw the storage latch pins 166 from the receptacles 168. Unlatching the storage latch mechanism frees the rear wheel section 66 to rotate rearward away from the front wheel section 64 to the in-use configuration in FIGS. 1 and 6.

In an alternate example, the stroller chassis 52 can be folded first and then the handle 54 can be repositioned to the stowed position. The storage latch mechanism won't engage until the handle reaches a position sufficient to allow the storage pins to extend. In such an example, the chassis can have a positive stop that will position the chassis components with the storage receptacles properly located to receive the storage pins 166. In another example, the fold latch mechanism and either or both of the storage latch mechanism and handle latch mechanism could be dependent on one another with one not being able to latch or unlatch without the other being first unlatched or latched. In yet another example, motion of the handle 54 and the chassis 52 can be coupled instead of being independent as in the disclosed example. In such an example, movement of one of the chassis or handle from one position to another can cause movement of the other from one position to another. In the disclosed example, the chassis must be folded and unfolded manually or at least by gravity. In an alternate example, the chassis can be configured to fold or unfold automatically upon actuation of the fold latch mechanism and/or the handle 54. In a further example, the stroller seat could be constructed so as to fold with the frame assembly instead of being removed for folding. The release handle could be relocated so as to be accessible under, but behind the seat with the seat in place on the frame assembly.

The release handle, housing and cover, safety catch, and shuttle and pin arrangement of the disclosed mechanism can vary in configuration and construction from the examples shown herein. A single fold latch pin can be utilized instead of the two pins 226. The parts can be fabricated from a variety of different materials as well. In one example, the release handle, housing and cover, and safety catch button can be made from a plastic with a high toughness or strength, such as Nylon. The release handle can be over-molded with soft TPE for better grip and comfort. The shuttles, fold latch pins, and safety catch finger can also vary from the examples shown and the materials used to fabricate these components can also vary. The catch finger could be made from an engineering plastic such as Acetal with good lubricity to reduce friction. The fold latch mechanism and components can be relocated to another position on the stroller frame different from that shown and described herein. The front leg section 64 can be configured to rotate and the rear wheel section 66 can be fixed, or both can be configured to rotate during folding. The center axle can be fixed to the rear wheel structure instead of the front wheels structure as well. The fold latch mechanism can be located differently, such as on the real wheel section, to accommodate such alternate structures.

The various compression springs disclosed herein for all of the mechanisms can be wound from spring-tempered steel. The storage and fold latch pins can be made from steel or aluminum for high-strength. The cables can be made from twisted multi-strand steel with crimped-on zinc attachment points and can employ a sheath, if desired. The various joints, mechanisms, and components can be installed and fastened in place using rivets and/or screws or other types of removable or permanent fasteners as desired.

Although certain stroller frame assembly latches and components have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A storage latch mechanism for a foldable stroller having a frame assembly with a chassis and a handle, the frame assembly being reconfigurable between an in-use configuration and a folded configuration and the handle being movable between a normal use position and a stowed position relative to the chassis, the storage latch comprising:
   first and second storage latch parts carried on the frame assembly, the first and second latch parts being latched to one another with the frame assembly in the folded configuration and being unlatched from one another in the in-use configuration,
   characterized in that movement of the handle to the stowed position frees the storage latch mechanism to latch and movement of the handle from the stowed position to the normal use position unlatches the storage latch mechanism.

2. A storage latch mechanism according to claim 1, wherein the first latch part is a storage pin and the second latch part is a receptacle sized to receive the storage pin, the storage pin being retracted from the receptacle in an unlatched condition and extended into the receptacle in a latched condition.

3. A storage latch mechanism according to claim 1, wherein the first latch part is a storage pin and the second latch part is a receptacle, wherein the storage pin is biased to a latched condition within the receptacle and is connected to one end of a cable that, when actuated, moves the storage pin to an unlatched condition retracted from the receptacle.

4. A storage latch mechanism according to claim 3, wherein an opposite end of the cable is coupled to a part of a handle pivot joint.

5. A storage latch mechanism according to claim 1, further comprising:
- a cable connected between a handle pivot joint of the handle and the first latch part; and
- a storage cam positioned within the handle pivot joint that rotates in concert with movement of the handle to actuate the cable to unlatch the first latch part.

6. A storage mechanism according to claim 5, wherein the first latch part is biased toward a latched condition.

7. A foldable stroller frame assembly comprising:
- a chassis;
- a handle coupled to the chassis, the frame assembly being reconfigurable between an in-use configuration and a folded configuration and the handle being movable between a normal use position and a stowed position relative to the chassis;
- a storage latch mechanism carried on the frame assembly and capable of being latched with the frame assembly in the folded configuration to retain the folded configuration and of being unlatched with the frame assembly in the in-use configuration,
- characterized in that movement of the handle to the stowed position frees the storage latch mechanism to latch and movement of the handle to the normal use position unlatches the storage latch mechanism.

8. A frame assembly according to claim 7, wherein the chassis can be folded with the handle in the normal use position.

9. A frame assembly according to claim 8, wherein the storage latch mechanism does not latch until the handle is moved to the stowed position.

10. A frame assembly according to claim 7, wherein the handle can be moved to the stowed position with the chassis still in the in-use configuration.

11. A frame assembly according to claim 10, wherein the storage latch mechanism is ready to latch but does not latch until the chassis is folded to the folded configuration.

12. A frame assembly according to claim 7, wherein the handle can be moved to a reverse handle position that is intermediate to the normal use position and the stowed position.

13. A frame assembly according to claim 12, wherein the storage latch mechanism is unlatched with the handle in the normal use and reverse handle positions, and wherein movement of the handle from the stowed position to the reverse handle position unlatches the storage latch mechanism.

14. A frame assembly according to claim 7, wherein the chassis includes a front wheel section and a rear wheel section pivotally connected to one another, the first latch part carried on the front wheel section and the second latch part carried on the rear wheel section.

15. A frame assembly according to claim 14, wherein the first latch part is a storage pin and the second latch part is a receptacle sized to receive the storage pin, the storage pin being retracted from the receptacle in an unlatched condition and extended into the receptacle in a latched condition.

16. A frame assembly according to claim 7, wherein the first latch part is a storage pin and the second latch part is a receptacle, wherein the storage pin is biased to a latched condition within the receptacle and is connected to one end of a cable that, when actuated, moves the storage pin to an unlatched condition retracted from the receptacle.

17. A frame assembly according to claim 16, wherein an opposite end of the cable is coupled to a part of a handle pivot joint of the handle.

18. A frame assembly according to claim 7, further comprising a storage cam positioned within a handle pivot joint of the handle that rotates in concert with movement of the handle to unlatch the first latch part, wherein the first latch part is biased toward a latched condition.

19. A frame assembly according to claim 7, further comprising a fold latch mechanism positioned between left and right sides of the chassis and configured for latching the first and second wheel sections in the in-use configuration.

* * * * *